United States Patent [19]
Furuhashi et al.

[11] Patent Number: 6,151,232
[45] Date of Patent: Nov. 21, 2000

[54] POWER SUPPLY CIRCUIT UTILIZING A PIEZOELECTRIC TRANSFORMER THAT SUPPLIES POWER TO A LOAD WHOSE IMPEDANCE VARIES DEPENDING ON TEMPERATURE

[75] Inventors: Naoki Furuhashi; Shuuji Yamaguchi, both of Tokyo, Japan

[73] Assignee: NEC Corporation, Tokyo, Japan

[21] Appl. No.: 09/460,662

[22] Filed: Dec. 13, 1999

[30] Foreign Application Priority Data

Dec. 11, 1998 [JP] Japan .................................. 10-352995

[51] Int. Cl.⁷ .............................. H02M 5/42; H02M 7/44; H02M 7/68
[52] U.S. Cl. ............................. 363/97; 363/131; 310/318
[58] Field of Search .............................. 363/95, 97, 131, 363/16; 310/315, 318, 319, 314

[56] References Cited

U.S. PATENT DOCUMENTS

| | | | |
|---|---|---|---|
| 4,749,897 | 6/1988 | Natsume et al. | 310/317 |
| 5,621,184 | 4/1997 | Gwynn, II | 102/215 |
| 5,705,877 | 1/1998 | Shimada | 310/315 |
| 5,859,489 | 1/1999 | Shimada | 310/315 |
| 5,866,969 | 2/1999 | Shimada et al. | 310/318 |
| 5,886,477 | 3/1999 | Hombo et al. | 315/209 PZ |
| 5,886,514 | 3/1999 | Iguchi et al. | 323/299 |
| 5,912,428 | 6/1999 | Patti | 102/215 |
| 5,923,542 | 7/1999 | Sasaki et al. | 363/16 |
| 5,942,835 | 8/1999 | Furuhashi et al. | 310/316.01 |
| 5,969,954 | 10/1999 | Zaitsu | 363/16 |

FOREIGN PATENT DOCUMENTS

| | | | |
|---|---|---|---|
| 2-65100 | 3/1990 | Japan | H05B 41/392 |
| 4-70869 | 11/1992 | Japan | H02M 3/28 |
| 10-52068 | 2/1998 | Japan | H02M 7/538 |
| 11-67474 | 3/1999 | Japan | H02B 41/24 |

*Primary Examiner*—Shawn Riley
*Assistant Examiner*—Bao Q. Vu
*Attorney, Agent, or Firm*—Hutchins, Wheeler & Dittmar

[57] ABSTRACT

Disclosed is a power supply circuit for boosting drive voltage by a booster circuit, inputting the boosted voltage to the primary side of a piezoelectric transformer, and driving a load with an impedance of large temperature dependency by output voltage generated at the secondary side of the piezoelectric transformer. The circuit has: an excessively-small current detection means that outputs excessively-small current signal when load current flowing through the load is smaller than a predetermined value; a stopping means that stops the operation of the booster circuit when the excessively-small current signal is output; and a delaying means that sets a delay time according to the level of the output voltage. The stopping means determines the execution or inexecution of the operation according to the existence of the excessively-small current signal when the delay time passes.

17 Claims, 15 Drawing Sheets

POWER SUPPLY CIRCUIT UTILIZING A PIEZOELECTRIC TRANSFORMER THAT SUPPLIES POWER TO A LOAD WHOSE IMPEDANCE VARIES DEPENDING ON TEMPERATURE

FIELD OF THE INVENTION

This invention relates to a power supply circuit, and more particularly to, a power supply circuit that supplies power through a piezoelectric transformer to a load whose impedance varies depending on temperature.

BACKGROUND OF THE INVENTION

When a malfunction is detected in a power supply circuit for a load such discharge tube etc., it is necessary to stop the supply of power so as to protect the load and power supply circuit. Conventional power supply circuits equipped with such a protection function are, for example, disclosed in Japanese patent publication No.04-070869 (1992) and Japanese patent application laid-open No.10-052068 (1998).

FIG. 1 shows a first example of the conventional power supply circuits, which is disclosed in Japanese patent publication No.04-070869 (1992). This power supply circuit is composed of a load voltage detection means with resistors 112 and 113, a first reference voltage generation means with a resistor 126 and a capacitor 127, a second reference voltage generation means with resistors 123, 124 and a capacitor 115, an IC section 100 that generates power-supply voltage based on the two reference voltages and the load voltage detection value, a power amplification section with resistors 104, 107, a transistor 105 and a main transistor 106, a transformer 108 that is driven by the main transistor 106, a rectification diode 109 connected to the secondary coil of the transformer 108, and a capacitor 110 to smoothing the output of the diode 109.

The IC section 100 is composed of a comparator 101 to which the first reference voltage is input, an output transistor 102 which is connected to the comparator 101 and drives a transistor 105, an error amplifier 114 to which the load voltage detection value is input, a comparator 121 connected to the error amplifier 114, a transistor 116 connected to the comparator 121, a resistor 125 as a load of the transistor 116, transistors 117, 122 that drives the resistors 124, 125, a comparator 118 to which the output voltage of the transistor 117 and reference voltage Vr are input, a latch circuit 119 connected to the comparator 118, a transistor 120 which is driven by the latch circuit 119 and controls the input stage of the output transistor 102, and an oscillator 128 which outputs oscillation frequency to the comparator 101.

In FIG. 1, the output transistor 102 is actuated by out put voltage VD of the comparator 101. With the start of the output transistor 101, the transistors 105, 106 are actuated. The main transistor 106 drives the primary coil of the transformer 108 by frequency output from the comparator 101, thereby generating boosted AC voltage at the secondary coil. The output of the transformer 108 is rectified by the diode 109, then smoothed by the capacitor 110, output as DC voltage from the output terminal 111. The terminal voltage (Vout) of the capacitor 110 is taken out through a voltage divider circuit with the resistors 112 and 113, input to one terminal of the error amplifier 114, compared with the reference voltage Verr. Output voltage VB according to this comparison result is input, as one input voltage, to the comparator 101. The comparator 101 compares output VA of the oscillator 126, output voltage VB of the error amplifier 114 and terminal voltage VC of the resistor 124. The transistor 102 is driven by a pulse cycle according to the comparison result, and finally the turn-on state of the transformer 108 is controlled. According to the turn-on control, the secondary-coil output voltage of the transformer 108 varies.

On the other hand, according to the output voltage of the comparator 121, the transistors 116, 122 and 117 are driven and terminal voltage VC of the resistor 124 varies. The variation of terminal voltage VC is compared with the reference voltage Vr by the comparator 118. When VC>Vr, the comparator 118 outputs a voltage. The output of the comparator is latched by the latch circuit 119, and the transistor 120 is turned on by the latch output. By the turn-on of the transistor 120, the base voltage of the output transistor 102 comes to zero level. Since the transistors 102, 105 and 106 are turned off, the transformer 108 outputs no voltage.

FIG. 2 shows the operation at some parts of the power supply circuit in FIG. 1. At the comparator 101, of output voltage VB of the error amplifier 114 and output voltage VC of the resistor 124, either one with lower voltage is compared with VA. At the start of operation, output voltage Vout is zero and output voltage VE divided by the resistors 112, 113 is also zero. The divided voltage VE is compared with reference voltage Verr by the error amplifier 114. When the divided voltage VE is zero, output voltage VB of the error amplifier 114 scales out to the fullest extent in the positive direction. Thus, the comparator 101 compares output voltages VA and VC, and, after the start of operation, the potential (terminal voltage VC) of the capacitor 115 increases gradually from zero while being charged. Therefore, the pulse width of output voltage VD of the comparator 101 also increases gradually. Thereby, the soft starting begins. During this time, since output VB of the error amplifier 114 is above reference voltage Vi, the output of the comparator 121 becomes high level and the transistor 116 turns on. Thus, the transistors 122, 117 give a charge to the capacitor 115. Before terminal voltage VC of the capacitor 115 exceeds reference voltage Verr, output voltage Vout of the output terminal 111 reaches a given value. The input of the error amplifier 114 is balanced to be VE ≈Verr, and output voltage VB becomes less than reference voltage Vi, thereby the transistor 116 is shut off. Here, terminal voltage VC of the capacitor 115 is stabilized by a voltage determined by the resistors 123, 124.

When the short-circuiting between the output terminals 111 occurs during the stable operation of the power supply circuit, output voltage Vout becomes zero. Therefore, output voltage VB of the error amplifier 114 shifts to the positive side, and exceeds reference voltage Vi. As a result, the transistor 116 turns on, and the capacitor 115 is charged by the transistor 117. When the terminal voltage of the capacitor 115 exceeds reference voltage Verr, the output voltage of the comparator 118 turns into high level, and is latched by the latch circuit 119. Thus, the transistor 120 turns on and the output transistor 102 turns off.

The power supply circuit in FIG. 1 has a characteristic that circuits for both soft-starting and short-circuit protection can be configured by using one capacitor 115. Also, in the process of operating the protection circuit, by providing a delay time before operating the protection circuit, the protection circuit can be prevented from malfunctioning due to a load short-circuiting in short time or a noise.

FIG. 3 shows a second example of the conventional power supply circuits. This power supply circuit is used as an inverter device to turn on a discharge lamp and is disclosed in Japanese patent application laid-open No.02-065100 (1990).

The inverter device is composed of a diode bridge 201 for power supply, a capacitor 202 for the smoothing connected to the output of 201, a resistor 203 connected to a detection power-supply line PL1, a switch 204 connected to the output side of the resistor 203, a resistor 205 connected to the switch 204, a capacitor 206 connected to the output side of the resistor 203, a diode 207 connected to the output end of the detection power-supply line PL1, resistors 208, 209 connected between the anode of the diode 207 and the earth line, a transistor 210 to the base of which a voltage divided by the resistors 208, 209 is input, a resistor 211 connected between the anode of the diode 207 and the collector of the transistor 210, a resistor 213 between the collector of the transistor 210 and the earth line, a transistor 214 to which a voltage at the connection point between resistors 211 and 213, resistors 210, 212 connected between the collector of the transistor 214 and the detection power-supply line PL1, a transistor 215 whose base is connected to the connection point of the resistors 210, 212, resistors 216, 217 and 219 connected between the collector of the transistor 215 and the earth line, a transistor 218 to the base of which the output voltage of the resistor 215 is input and whose emitter is connected to the connection point of the resistors 217 and 219, a resistor 220, a diode 221 and a resistor 222 that are connected between the emitter of the transistor 218 and the output of the diode bridge 201, a capacitor 223, a transistor 227 and a diode 228 that are inserted in series between the output of the diode bride 201 and the earth line, a diode 229 connected between the collector of the transistor 227 and the cathode of the diode 228, a ballast transformer 232 with a third coil N3 connected between the detection power-supply line PL1 and the earth line, a diode 230 connected to one end of the coil N3, a capacitor 231 connected between another end of the coil N3 and the diode 230, a capacitor 223 connected between the collector of the transistor 227 and the output of the diode bridge 201, a coil 224 that is provided with an intermediate tap and connected between the output of the diode bridge 201 and the first coil N1 of the ballast transformer 232, a capacitor 225 and a coil 226 that are connected in series between the base of the transistor 227 and one end of the second coil N2, discharge lamp 233 (TLP), as a load, that is connected between the output of the diode bridge 201 and another end of the first coil N1, and a capacitor 234 connected between the filaments of the discharge lamp 233.

When the switch 204, which is a dimmer switch, turns on, the resistor 205 connected in series to the switch 204 is connected in parallel to the resistor 208, and then the base voltage of the transistor 210 increases abruptly, turning on the transistor 210. Thus, the normal operation of dimmer can be conducted.

FIG. 4 shows the change of terminal voltage of the capacitor 206 in the power supply circuit in FIG. 3. The operation of the power supply circuit in FIG. 3 is explained below referring to FIG. 4.

The alternating-current power supply AC is rectified and smoothed by the diode bridge 201 and the capacitor 202. When power is applied through the coil 224 to the first coil N1 of the ballast transformer 232, the feedback is conducted from the second coil N2 of the ballast transformer 232 through the coil 226 and the capacitor 225 to the base of the transistor 227, thereby the transistor 227 oscillates. Thus, the self-excited oscillation of the transistor 227 starts, the first coil N1 is continuously fed with a given cycle of current, a radio-frequency voltage is continuously output between both ends of (first coil N1+coil 224), thereby pre-heating current is supplied to the discharge lamp 233. The radio-frequency voltage generated is taken out from the control coil N3 of the ballast transformer 232. Then, a voltage rectified and smoothed by the diode 230 and the capacitor is taken out through the detection power-supply line PL1, then supplied to the control circuit composed of the transistors 210, 214, 215 and 218.

At the beginning of power supplying, since the voltage to charge the capacitor 206 does not occur, the transistor 214 is turned off. Therefore, the transistors 215, 218 are turned off. Also, the base feedback resistance of the transistor 227 is a high resistivity by the serial resistors 219, 220, and the transistor 227 is in the operation dependent on the resistor 222. Thus, the discharge lamp 233 comes into the dimming state, where the pre-heating of the discharge lamp 233 is conducted.

As shown in FIG. 4, the capacitor 206 is gradually charged with time through the resistor 203. When the terminal voltage increases more than a predetermined value at time t1, the transistor 214 turns on. In response to this, the transistors 215, 218 also turn on, both ends of the resistor 219 are short-circuited, the base feedback resistance of the transistor 227 is as low as nearly only the resistor 220, thus coming into the full-drive state. Therefore, a high voltage is generated at the coil N1, thereby the discharge lamp 233 turns on.

Here, when the discharge lamp 233 does not turn on due to the deterioration of lighting performance, the load impedance increases offering the light-load state and the output voltage (terminal voltage of the discharge lamp 233) increases gradually. In this state, the voltage at both ends of the capacitor 206, as shown in FIG. 4, continues to increase even after passing time t2. Then, after a given time (time t3) determined by a time constant for the resistor 203, the capacitor 206, the resistor 208 and the resistor 209, the transistor 210 turns on and all the transistors 214, 215 and 218 are cut off. Thereby, the power supply circuit turns into the dimmer mode, where the inverter output voltage is lowered and the components of the circuit are protected from high voltage. Meanwhile, when the discharge lamp 233 turns on normally, the voltage at both ends of the capacitor 206 does not increase to such high level, therefore the transistor 210 does not turn on and the inverter circuit continues to light the discharge lamp 233 at the rated voltage.

FIG. 5 shows the composition of a conventional power supply circuit using a piezoelectric transformer. This power supply circuit is used as an inverter that drives cold-cathode tube as a load. The details of this circuit is disclosed in Japanese patent application laid-open No.10-052068 (1998). In inverters using a piezoelectric transformer, a protection circuit is provided so as to prevent the deterioration of piezoelectric transformer's characteristic and to reduce the heat generation of circuit component in the opening of load.

The power supply circuit is composed of a piezoelectric transformer 301 with a load 302 connected, a frequency control circuit 303 connected to the load 302, a booster circuit 304 connected to the piezoelectric transformer 301, an overvoltage protection circuit 310 connected to the load 302 and the frequency control circuit 303, and a drive voltage control circuit 311 connected to the frequency control circuit 303 and the booster circuit 304.

FIG. 6 shows the output characteristic of the piezoelectric transformer 301. The piezoelectric transformer 301 is composed of a primary side electrode and a secondary side electrode formed on a plate-like piezoelectric ceramics. By applying AC voltage with resonance frequency to the primary side electrode, output voltage is generated at the secondary side electrode by piezoelectric effect. The piezoelectric transformer 301 has high output impedance and its operation depends on load impedance. Therefore, as shown in FIG. 6, when the load impedance is high, the boost ratio increases and thus high voltage is output. The piezoelectric transformer 301 with such structure and characteristic has advantages that can offer a miniaturized and thinned body, compared with electromagnetic transformers. Thus, the use of a power supply for backlight LCD etc. attracts attentions.

The frequency control circuit 303 is composed of a current-voltage conversion circuit 312 to convert the current through the load 302 to a voltage value, a rectification circuit 313 to rectify the output of the current-voltage conversion circuit 312, a comparator 314 to compare the output of the rectification circuit 313 with reference voltage Vref, an integrator 315 to conduct the integration based on the output voltage VP1 of the overvoltage protection circuit 310, the output voltage of the comparator 314 and the output voltage of a comparator 316, the comparator 316 to compare the output voltage of the integrator 315 and reference voltage Vmin, a VCO (voltage-controlled oscillator) 317 to output control voltage Vr and Vvco based on the output voltage Vint of the integrator 315

The booster circuit 304 is composed of a first automatic transformer 305, a second automatic transformer 306, a first switching transformer 307, a second switching transformer 308, and a double phase drive circuit 309 to drive the first and second switching transformers 307, 308. The double phase drive circuit 309 drives the first and second switching transformers 307, 308 based on the control voltage Vvco output from the VCO 317.

The overvoltage protection circuit 310 is composed of a voltage division circuit 318 to divide the output voltage of the piezoelectric transformer 301, a rectification circuit 319 to rectify the output voltage of the voltage division circuit 318, and a comparison block 320 to compare the output voltage of the rectification circuit 319 with comparison voltage Vmax.

The operation of the booster circuit 304 is explained below. By reverse-phase clock output from the double drive circuit 309, the first switching transistor 307 and the second switching transistor 308 are turned on alternately. Thereby, power is supplied form the power supply VDD to the primary side of the first and second automatic transformers 305, 306, charged as current energy. When the first and second switching transistors 307, 308 are turned off alternately, the first and second automatic transformers 305, 306 discharge the charged energy. This charged energy is converted into voltage resonance waveform by the equivalent input capacitance of the piezoelectric transformer 301 and the load 302 and the summed inductance of the primary-side inductance and the secondary-side inductance of the automatic transformer, then applied to the primary side electrode of the piezoelectric transformer 301.

The operation of the frequency control circuit 303 is explained below. Load current Io of the load 302 is converted into a voltage value by the current-voltage conversion circuit 312, then converted into DC voltage by the rectification circuit 313. This DC voltage is compared with reference voltage Vref by the comparator 314. When the DC voltage is low, the comparator 314 outputs such signal that the output of the integrator 315 is increased at a constant rate, to the integrator 315 The signal output from the integrator 315 is input to the VCO 317. The VCO 317 outputs a frequency pulse inversely proportional to a voltage value input. By half of this frequency, the transistors 307, 308 are driven, and thereby the piezoelectric transformer 301 is driven. Accordingly, when load current Io is less than a predetermined value, the drive frequency of the piezoelectric transformer 301 continues to lower.

As shown in FIG. 6, since the piezoelectric transformer 301 is set so that it has a drive frequency f lower than its start point of frequency f1, the boost ratio of the piezoelectric transformer 301 increases as drive frequency f comes close to resonance frequency fr and load current Io increases with time. When drive frequency f continues to lower until a voltage input to the comparator 314 is higher than reference voltage Vref at drive frequency f0 as shown in FIG. 6, the comparator 314 generates output signal so that the output of the integrator 315 continues to hold a latest output value. As a result, the output frequency of the VCO 317 becomes constant, the piezoelectric transformer 301 is driven at constant frequency f0 and load current Io becomes constant.

After the piezoelectric transformer 301 starts driving at constant frequency, when load current Io varies due to a variation in impedance of the load 302 etc. thereby input voltage of the comparator 314 becomes lower than reference voltage Vref, the drive voltage of the piezoelectric transformer 301 begins to lower again. In the stage that the input voltage of the comparator 314 is not above reference voltage Vref, when the drive frequency of the piezoelectric transformer 301 continues to lower, the drive frequency reaches f2 as shown in FIG. 6. Since at f2, the output voltage Vint of the integrator 315, which corresponds to the input of the comparator 316, is higher than reference voltage Vmin, the comparator 316 outputs reset signal Vr to the integrator 315 When the integrator 315 is reset, output voltage Vs becomes minimum. As a result, the output of the VCO 317 comes to the highest frequency and the piezoelectric transformer 301 is driven at drive frequency f1. From this stage, the drive frequency of the piezoelectric transformer 301 starts to lower again. In this operation, when a frequency where the input voltage of the comparator 314 becomes higher than reference voltage Vref is detected, the output voltage of the integrator 315 is locked and the output frequency of the VCO 317 becomes constant.

The double-phase drive circuit 309 generates output voltages Vg1, Vg2 with different phases. The double-phase drive circuit 309 repeats the inversion between output Vg1 and Vg2 each time Vvco is input from the frequency control circuit 303. The drain voltage Vd1 of the first switching transistor 307 is input to the drive-voltage control circuit 311. When the value of drain voltage Vd1 is above a predetermined value, the input voltage from VDD is output, in time-division manner, to the first automatic transformer 305 and the second automatic transformer 306. The frequency of time-division outputting is determined by Vvco from the VCO 317. Therefore, even when the power source VDD varies, it can keep a high power transform efficiency, as an inverter.

The overvoltage protection circuit 310 is provided to prevent the piezoelectric transformer 301 from being self-destroyed by the over-vibration when the booster ratio becomes high due to high load impedance. To the voltage divider circuit 318, piezoelectric transformer output voltage Vo output from the secondary-side electrode of the piezoelectric transformer 301 is applied. The output voltage of the voltage divider circuit 318 is converted into DC voltage Vr by the rectification circuit 319, then input to the comparison block 320. The comparison block 320 compares the output voltage of the rectification circuit 319 with reference voltage Vmax, and when Vr>Vmax, it outputs two output signals Vp1 (signal to reset the integrator 315) and Vp2 (signal to change the upper limit value of output frequency from the VCO 317). Vp1 is signal that is output only when input voltage is higher than reference voltage Vmax, and Vp2 is signal that is continuously output for a certain time (time required until the output of the integrator 315 changes from the minimum voltage to the maximum voltage) when input voltage is higher than reference voltage Vmax.

FIG. 7 shows the operation of the power supply circuit in FIG. 5. In FIG. 7, the relationships among drive frequency of the piezoelectric transformer 301, piezoelectric transformer output voltage Vo and output signals Vp1, Vp2. The output of the integrator 315 comes to the minimum voltage when output signal Vp1 is input. Therefore, the division ratio of voltage is set so that output voltage Vo, at a voltage higher than which the piezoelectric transformer 301 may incur deterioration in characteristic, is equal to reference voltage Vmax (Vo=Vmax) after passing the rectification circuit 319.

When the load 302 is a cold-cathode tube used for backlight of LCD for notebook computer, the rated power of the piezoelectric transformer 301 is generally about 4 W. In this piezoelectric transformer 301, by setting the maximum of output voltage Vo about 1500 to 2000 V, the deterioration in characteristic can be avoided, and the voltage can exceed the lighting start voltage of the cold-cathode tube (load 302). In FIG. 6, frequency at which output voltage of the rectification circuit 319 is higher than reference voltage Vmax is f3. The upper limit of drive frequency of the piezoelectric transformer 301 is normally set at frequency f1 in FIG. 6, but it is switched to f4, maximum frequency in the period that output voltage Vp2 is input to the VCO 317.

When output voltage Vo of the piezoelectric transformer 301 is lower than a predetermined value and load current Io is smaller than a predetermined value, the frequency of the piezoelectric transformer 301 is scanned between frequencies f1 and f2 in FIG. 6. Also, when output voltage Vo of the piezoelectric transformer 301 is higher than a predetermined value and load current Io is smaller than a predetermined value, the frequency of the piezoelectric transformer 301 is scanned between frequencies f4 and f3 in FIG. 6. Here, a case that output voltage Vo of the piezoelectric transformer 301 is higher than a predetermined value and load current Io is smaller than a predetermined value is, for example, when the load is opened due to the breaking of connection line. In the opening of load, since the load impedance is high, output voltage Vo of the piezoelectric transformer 301 increases, and the load current is at zero since the load is disconnected. In this situation, since the load is not likely to be connected and the load current Io is short of a predetermined value, the drive frequency of the piezoelectric transformer 301 is continuously scanned.

The resonance waveform to drive the piezoelectric transformer 301 is controlled so that it is half-wave type sine wave by setting the inductance of the automatic transformers 305, 306 to optimize the zero-switching at frequency f0 in FIG. 6. Thereby, the power transform efficiency as an inverter can be optimized.

In the composition in FIG. 6, when output voltage Vo of the piezoelectric transformer 301 is higher than a predetermined value and load current Io is smaller than a predetermined value (i.e., when the load is opened), the frequency of the piezoelectric transformer 301 is continuously scanned for a long time or infinite time. So, in FIG. 6, the upper-limit of scanning frequency is switched from f1 to f4. By this switching, the break of zero-switching of resonance waveform at the automatic transformers 305, 306 can be reduced, and thereby the heat generation of component can be reduced.

Meanwhile, in an inverter using a cold-cathode tube as a load, when a malfunction is detected after turning on the power supply VDD, there are two incompatible requirements in a time period until when the overvoltage protection circuit starts to operate. The first requirement is to shut off the output after continuing the inverter output for at least 5 to 6 seconds after turning on the power supply. Also, the second requirement is to stop the circuit operation to drive the piezoelectric transformer 301 immediately, e.g. about 0.1 second, after turning on the power supply to shut off the output. The reasons are explained below.

The reason for the first reason is as follows. When the atmosphere used is at low temperature, a time of about one second may be required from the start of voltage application to the load (cold-cathode tube) to the lighting. In such environment, since the impedance of cold-cathode tube before the lighting is high, a time longer than usual is needed until reducing to such an impedance value that the lighting can be started after starting the voltage application. Therefore, to guarantee the lighting of cold-cathode tube even at low temperature, it is necessary to conduct the shut-off operation of the protection circuit after the non-lighting state of the cold-cathode tube continues for more than 5 to 6 seconds. When the setting is that the operation is stopped after 0.5 second since turning on the inverter power supply under the environment that the cold-cathode tube turns on after one second since turning on the inverter power supply, the shut-off circuit must start to operate despite the condition that the cold-cathode tube turns on after one second since turning on the inverter power supply. Thus, the circuit to drive the piezoelectric transformer 301 is stopped and therefore the cold-cathode tube is not turned on. Meanwhile, recently, to improve the safety, it is desired that the inverter circuit is stopped completely, instead of changing the operation mode as described in Japanese patent application laid-open No.02-065100 (1990), when the cold-cathode tube does not turn on.

The reason for the second requirement is as follows. There is a case that in a malfunction such as an open/short test, the component of booster circuit may emit smoke before the fusing of fuse. This is because when a coil or switching transistor composing the booster circuit is open-circuited or short-circuited and the switching operation of switching transistor is therefore stopped, current larger than usual flows into the booster circuit, thereby causing the emission of smoke. In general, fuses are selected so that the value of current flown at the normal state is less than 80% of fuse rated value. Therefore, even when current larger than usual flows in a moment of time, the fuse may not be fused. In such case, before the fusing of fuse, the component of booster circuit may emit smoke. However, the occurrence of such a malfunction cannot be accepted from the viewpoint of safety. Namely, when a malfunction is detected, it is necessary that the circuit to drive the piezoelectric transformer 301 is stopped within a time (e.g. 0.1 second).

The first and second requirements mentioned above are opposite to each other about the time until the start of shut-off operation. However, both are indispensable requirements in operating a power supply circuit using a piezoelectric transformer.

The conventional power supply circuits have some problems described below.

(1) For excessively-small load current, they cannot determine whether the piezoelectric transformer is need to continue operating or needed to stop operating immediately. For example, in case of Japanese patent application laid-open No.10-052068 (1998), when one of the first and second switching transistors (307, 308) stops operating while lighting the cold-cathode tube using the piezoelectric transformer drive means, the piezoelectric transformer continues to operate, despite the state that the output voltage is short of a predetermined value, by another switching transistor being operated.

FIG. 8 shows waveforms at some parts in the case that one of the switching transistors stops operating. (a) in FIG. 8 shows the drive frequency of the piezoelectric transformer 301. Here, since load current Io is short of a predetermined value, it is scanned between frequencies f1 and f2 in FIG. 6. (b) in FIG. 8 shows load current Io. The load current has a large value instantaneously when the drive frequency passes through around the resonance frequency fr of the piezoelectric transformer 301. (c) in FIG. 8 shows output voltage Vo of the piezoelectric transformer 301. Since the impedance of cold-cathode tube is reduced to a value to allow the lighting, the effective value is slightly lower than the output voltage in the normal lighting.

However, for the power supply circuit in Japanese patent application laid-open No.10-052068 (1998) which has such a composition that a malfunction is detected monitoring only one state of outputting, it is impossible to distinguish between the normal lighting and the malfunction of booster circuit while monitoring the output voltage Vo since there is not a significant difference between the two states. Therefore, since the piezoelectric transformer 301 must be operated continuously even in the malfunction of booster circuit, the component of the booster circuit may be broken.

The effective value of load current Io in the malfunction of booster circuit is near to zero as shown by (b) in FIG. 8 and the load current is also at zero when the load is opened. Therefore, these can be distinguished from the case of normal lighting. However, it is impossible to distinguish between a case that the piezoelectric transformer 301 is needed to stop operating immediately (e.g., 0.1 second after) as in case of malfunction of booster circuit and a case that it is needed to continue operating for at least several seconds as in the opening of load.

(2) They cannot change the time constant of timer circuit until stopping the drive circuit or switching the operation mode. The power supply circuits (inverters) mentioned above are composed so that when detecting a malfunction, they stop the drive circuit or switch the operation mode using the single time constant regardless of the cause of the malfunction. Thus, they cannot conduct proper control according to the state of operation.

(3) They do not satisfy the requirement to stop the output for safety or the requirement to provide a power saving function in case of stopping the output. The circuit in Japanese patent application laid-open No.02-065100 (1990) can change the operation mode but cannot shut off the output. In recent years, with the enhanced requirement to safety, it is required to stop outputting when detecting the non-lighting of cold-cathode tube or the opening of load. On the other hand, the circuit in Japanese patent application laid-open No.10-152068 (1998) stops outputting but does not stop the operation of OSC, comparators, transistors etc. When the outputting is shut off and the circuit is not operated normally, it is desired that the power supply to the electronic components not operated be shut off from the viewpoint of power saving. However, this circuit is not adapted to such a requirement.

SUMMARY OF THE INVENTION

Accordingly, it is an object of the invention to provide a power supply circuit that distinguishes between a malfunction in the output system and a waiting time for stabilizing a load, thereby allowing the proper protection operation to parts while guaranteeing the supply of power to the load.

According to the invention, a power supply circuit for boosting drive voltage by a booster circuit, inputting the boosted voltage to the primary side of a piezoelectric transformer, driving a load with an impedance of large temperature dependency by output voltage generated at the secondary side of the piezoelectric transformer, comprises:

an excessively-small current detection means that outputs excessively-small current signal when load current flowing through the load is smaller than a predetermined value;

a stopping means that stops the operation of the booster circuit when the excessively-small current signal is output; and a delaying means that sets a delay time according to the level of the output voltage;

wherein the stopping means determines the execution or inexecution of the operation according to the existence of the excessively-small current signal when the delay time passes.

According to another aspect of the invention, a power supply circuit for boosting drive voltage by a booster circuit, inputting the boosted voltage to the primary side of a piezoelectric transformer, driving a load with an impedance of large temperature dependency by output voltage generated at the secondary side of the piezoelectric transformer, comprises:

an excessively-small current detection means that outputs excessively-small current signal when load current flowing through the load is smaller than a predetermined value;

a stopping means that stops the operation of the booster circuit when the excessively-small current signal is output; and a delaying means that sets a delay time according to the level of the output voltage;

wherein the stopping means conducts the operation when the timing of the delay time is completed, and determines the inexecution of the operation when the timing of the delay time is discontinued.

BRIEF DESCRIPTION OF THE DRAWINGS

The invention will be explained in more detail in conjunction with the appended drawings, wherein.

DESCRIPTION OF THE PREFERRED EMBODIMENTS

Figure 1:
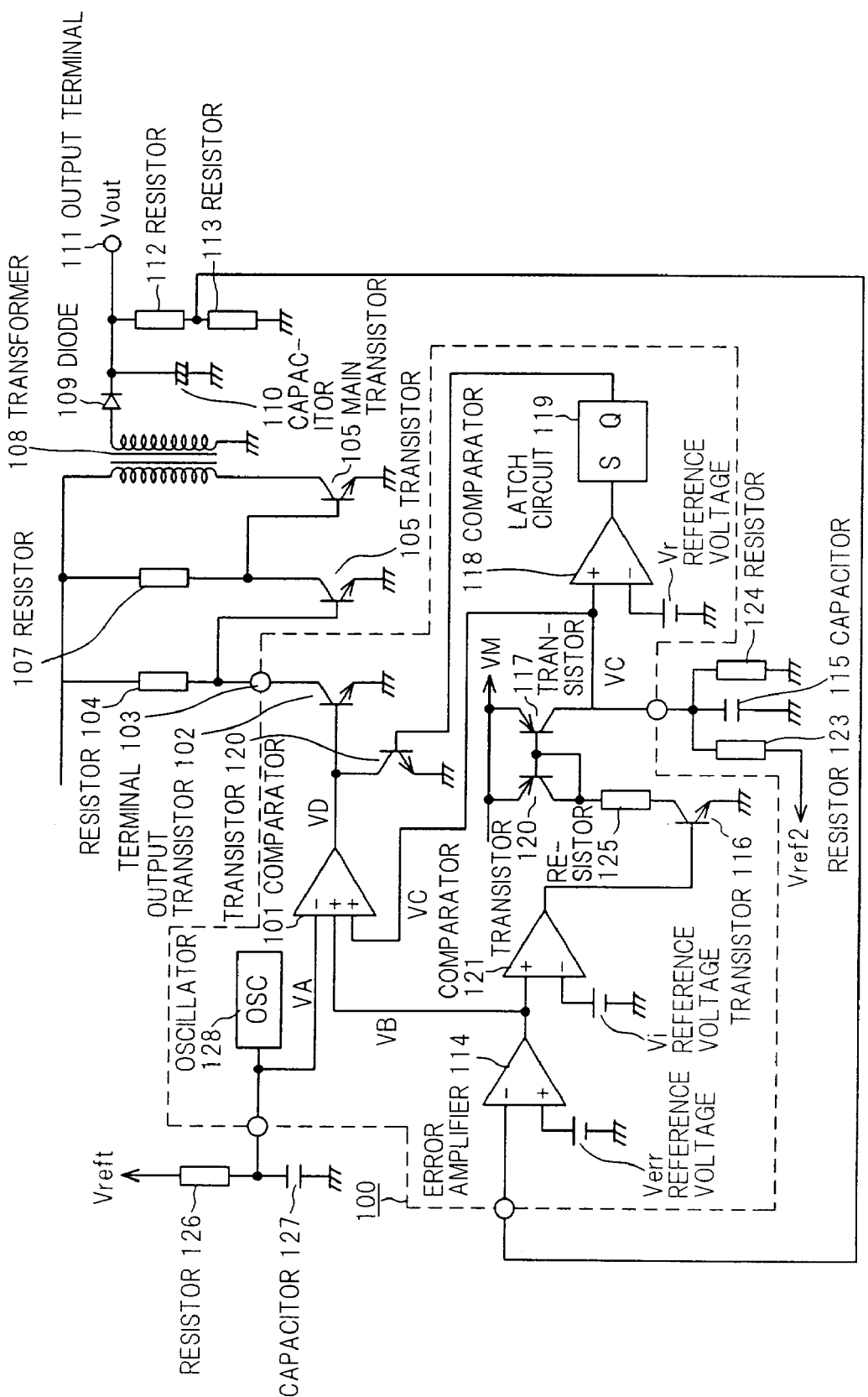
FIG. 1 is a circuit diagram showing the first example of inventional power supply circuits.

The preferred embodiments of the invention will be explained below referring to the drawings.

Figure 9:
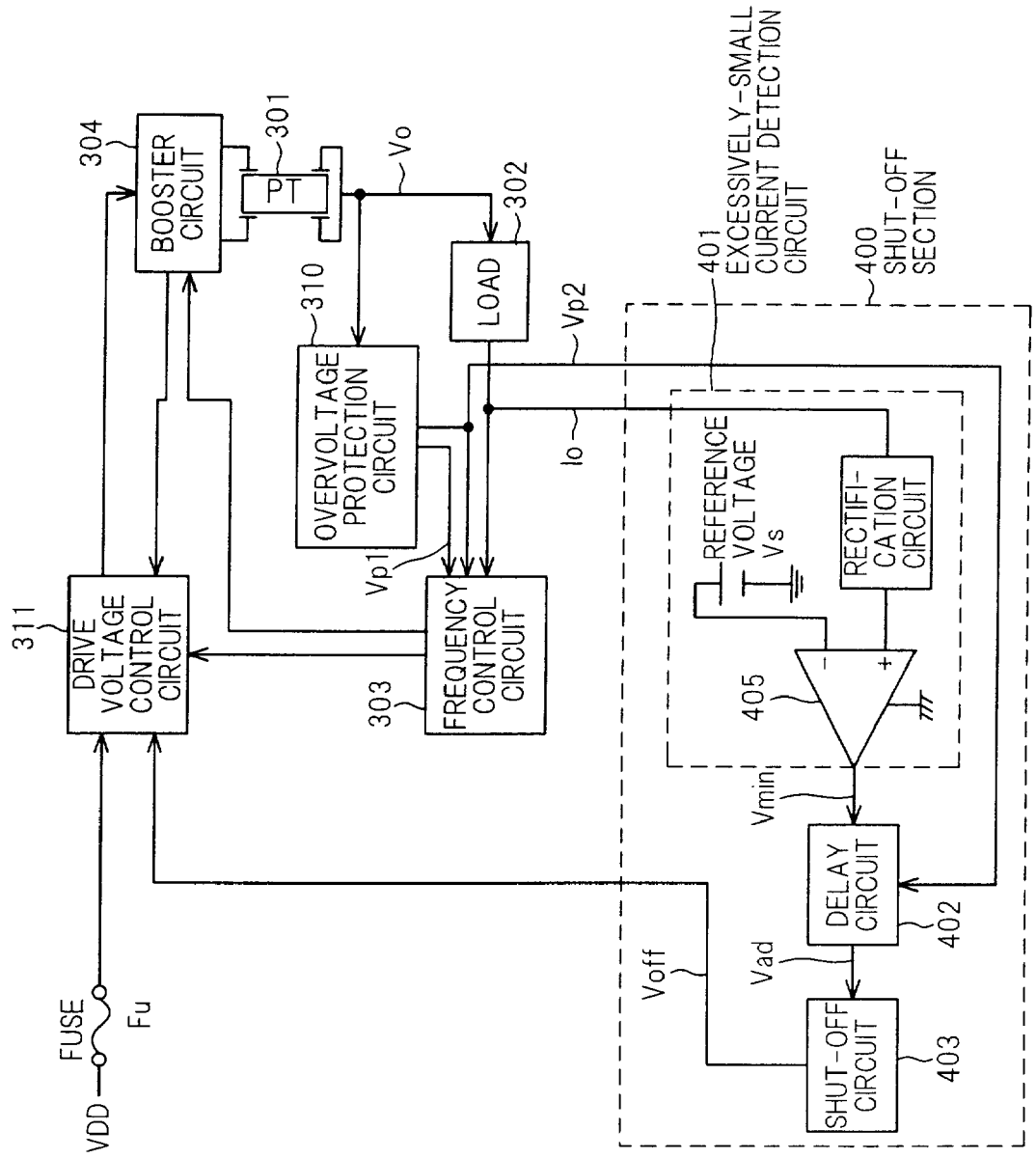
FIG. 9 is a circuit diagram showing a power supply circuit in a preferred embodiment according to the invention.

FIG. 9 shows a power supply circuit in a preferred embodiment according to the invention. The power supply circuit is composed of a piezoelectric transformer 301 connected to a load 302, a frequency control circuit 303 connected to the load 302, a booster circuit 304 connected to the piezoelectric transformer 301, an overvoltage protection circuit 310 connected to the load 302 and the frequency control circuit 303, a drive voltage control circuit 311 connected to the frequency control circuit 303 and the overvoltage protection circuit 310, and a shut-off section 400. In FIG. 9, the circuits except the shut-off section 400 have the same compositions or functions as the power supply circuit in FIG. 5. Therefore, the repetitive explanations for them are omitted below.

The shut-off section 400 is composed of an excessively-small current detection circuit 401 to which load current Io is input, a delay circuit 402 which outputs delay signal Vad based on output signal Vmin of the excessively-small current detection circuit 401 and output voltage Vp2 of the overvoltage protection circuit 310, and a shut-off circuit 403 which outputs output signal Voff based on delay signal Vad. The excessively-small current detection circuit 401 is composed of a rectification circuit 404 which rectifies a detection value of load current Io, and a comparator 405 which compares output voltage of the rectification circuit 404 with reference voltage Vs.

In operation, load current Io from the load 302 is input to the excessively-small current detection circuit 401. In the excessively-small current detection circuit 401, a rectified output voltage obtained by rectifying a voltage value transformed from the load current Io by the rectification circuit 404 is compared with reference voltage Vs by the comparator 405. When the rectified output voltage from the rectification circuit 404 exceeds reference voltage Vs, the comparator 405 generates high-level output signal.

The delay circuit 402 operates to output predetermined delay signal Vad to the shut-off circuit 403 when low-level voltage is input from the excessively-small current detection circuit 401. Also, to the delay circuit 402, output voltage Vp2 is input from the overvoltage protection circuit 310.

This output voltage Vp2 is output from the overvoltage protection circuit 310 when output voltage of the piezoelectric transformer 301 is higher than a given value. The delay circuit 402 is controlled by output voltage Vp2, and outputs two kinds of delay signal. Namely, when output voltage Vp2 is high-level signal, output is such delay signal that allows a long time passed until starting the shut-off operation of the shut-off circuit 403. Also, when output voltage Vp2 is low-level signal, output is such delay signal that allows a short time passed until starting the shut-off operation of the shut-off circuit 403.

The shut-off circuit 403 outputs signal to stop the operation of the piezoelectric transformer 301 when delay signal Vad is continuously output from the delay circuit 402 for a given time. The generation time of delay signal Vad output from the delay circuit 402 is long when high-level output voltage Vp2 is input to the delay circuit 402, and is short when low-level output voltage Vp2 is input to the delay circuit 402. The detailed values of these long and short times are described later. The object of the shut-off circuit 403 is to prevent the breaking of power supply circuit and the continuous output of high voltage when a malfunction occurs in the power supply circuit or in the load where the power supply circuit supplies power.

Although, in FIG. 9, output of the shut-off circuit 403 is applied to the drive voltage control circuit 311, it may be applied to the other circuit that can stop the operation of the piezoelectric transformer 301.

Figure 10:
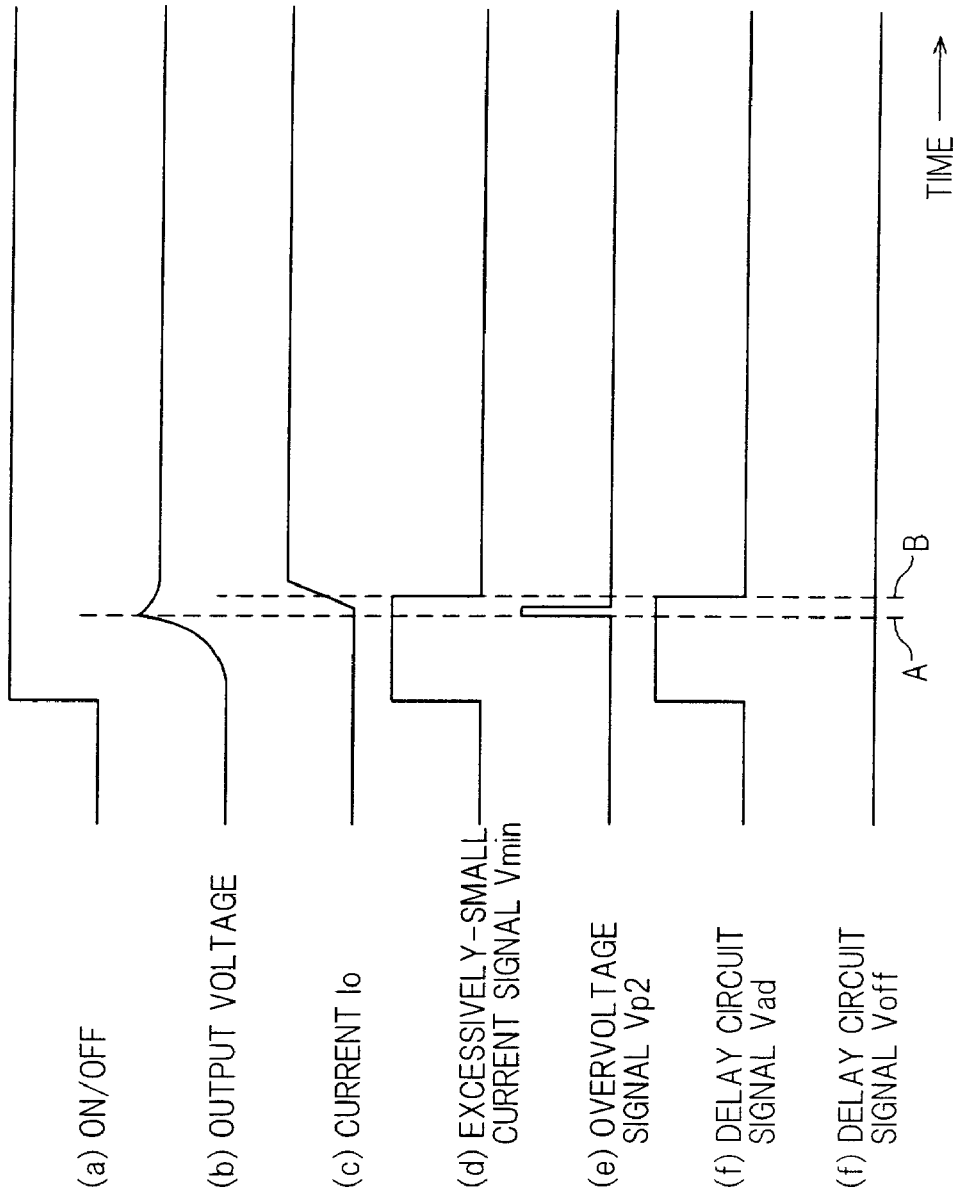
FIG. 10 is a timing chart showing the operation of the power supply circuit in FIG. 9 that is normally operated at ordinary temperature.

FIGS. 10 to 13 show the operation timing of the drive circuit in FIG. 9. FIG. 10 is a timing chart showing the operation that the power supply circuit is actuated normally at ordinary temperature. (a) in FIG. 10 indicates ON signal to start the operation of the piezoelectric transformer 301. For this ON signal, power supply VDD can be substituted or the operation start signal of IC, when the control circuit is IC-composed, can be substituted. When ON signal is input, output voltage Vo of the piezoelectric transformer 301 starts to increase, reaching the lighting start voltage of the load 302 (cold-cathode tube) at time A in FIG. 10. From time A, load current Io starts to increase, and on the contrary output voltage Vo lowers due to the load impedance characteristic of the load 302.

The reason why output voltage Vo increases after the inputting of ON signal and load current Io increases after output voltage Vo reaches the lighting start voltage of the cold-cathode tube is that the drive frequency of the piezoelectric transformer 301 is scanned from high frequency side to low frequency side. Just after ON signal is input, output voltage of the comparator 405 is low level since no load current Io flows, and the delay circuit 402 outputs delay signal to the shut-off circuit 403. Also, when output voltage Vo exceeds a predetermined value, output voltage Vp2 is input from the overvoltage protection circuit 310 to the delay circuit 402 at timing indicated by (e) in FIG. 10.

At time B in FIG. 10, load current Io reaches a predetermined value, and therefore the output of the comparator 405 becomes high level and delay signal Vad from the delay circuit 402 becomes low level. At this time, output voltage Vp2 is low level. The time period when delay signal Vad is output from the delay circuit 402 is shorter than a time need to make the shut-off circuit 403 generate when output voltage Vp2 is low level. Therefore, the shut-off circuit 403 does not conduct the shut-off operation.

Figure 11:
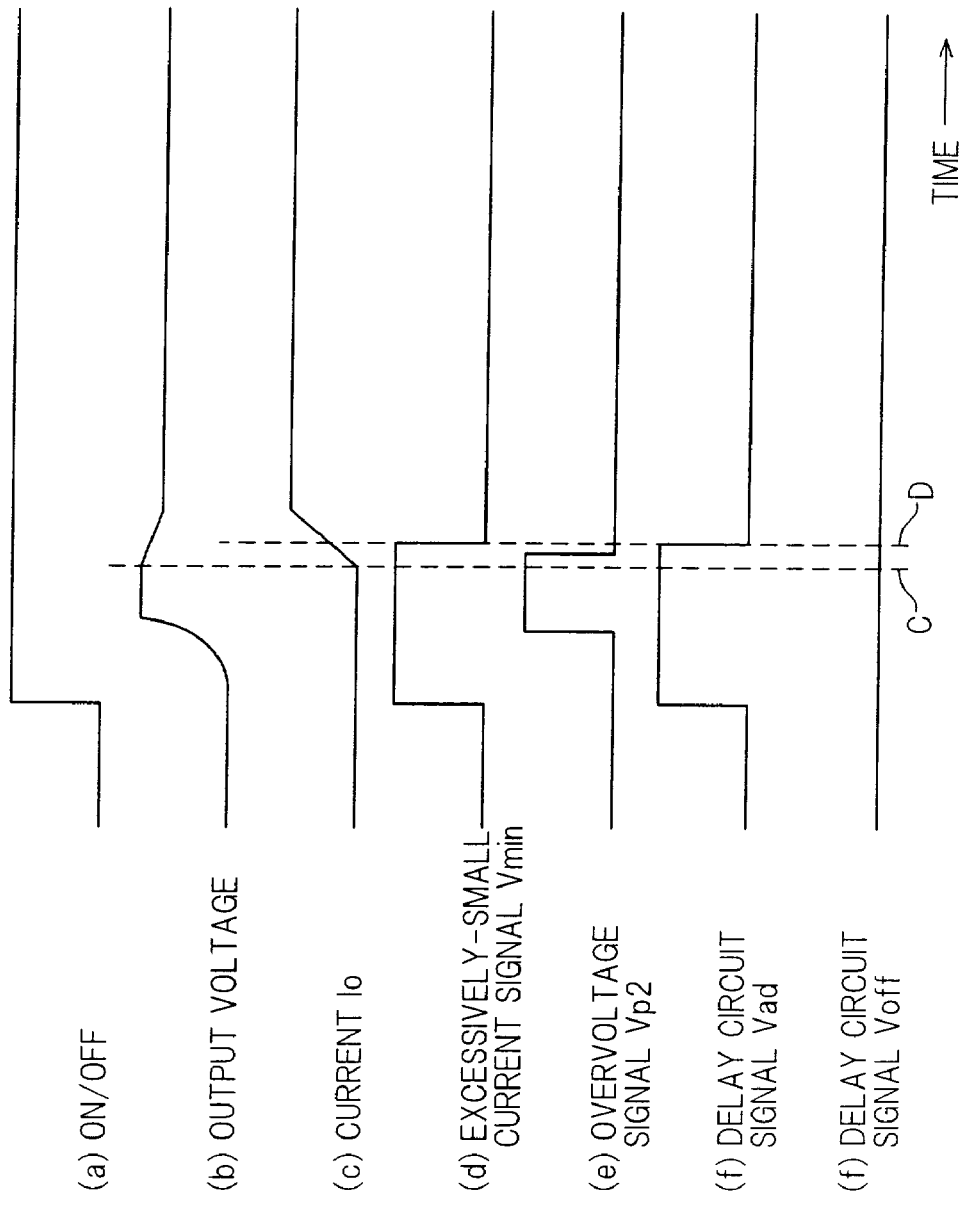
FIG. 11 is a timing chart showing the operation of the power supply circuit in FIG. 9 at low temperature.

FIG. 11 shows the operation of the power supply circuit of the invention under the environment of low temperature. When the atmosphere used is at low temperature, the impedance of the load 302 (cold-cathode tube) is higher than that at ordinary temperature. Therefore, as shown by (b) in FIG. 11, output voltage Vo is kept high level for a long time, during this time the load impedance reduces gradually, and then at time C the cold-cathode tube starts lighting. As shown by (e) in FIG. 11, the time period when output voltage Vp2 (overvoltage signal) is high level is longer than that at ordinary temperature. From time C load current Io starts increasing. At time D, load current Io reaches the predetermined value and, as shown by (d) in FIG. 11, excessively-small current signal Vmin turns into low level, simultaneously, as shownby (f) in FIG. 11, delay circuit signal Vad becomes low level. In this case, since output voltage Vp2 (overvoltage signal) is input for a long time, delay circuit signal Vad is needed to be output at high level in order to make the shut-off circuit 403 conduct the shut-off operation. However, since the time delay circuit signal Vad is kept high level is shorter than the predetermined time, the shut-off circuit 403 does not conduct the shut-off operation.

Figure 12:
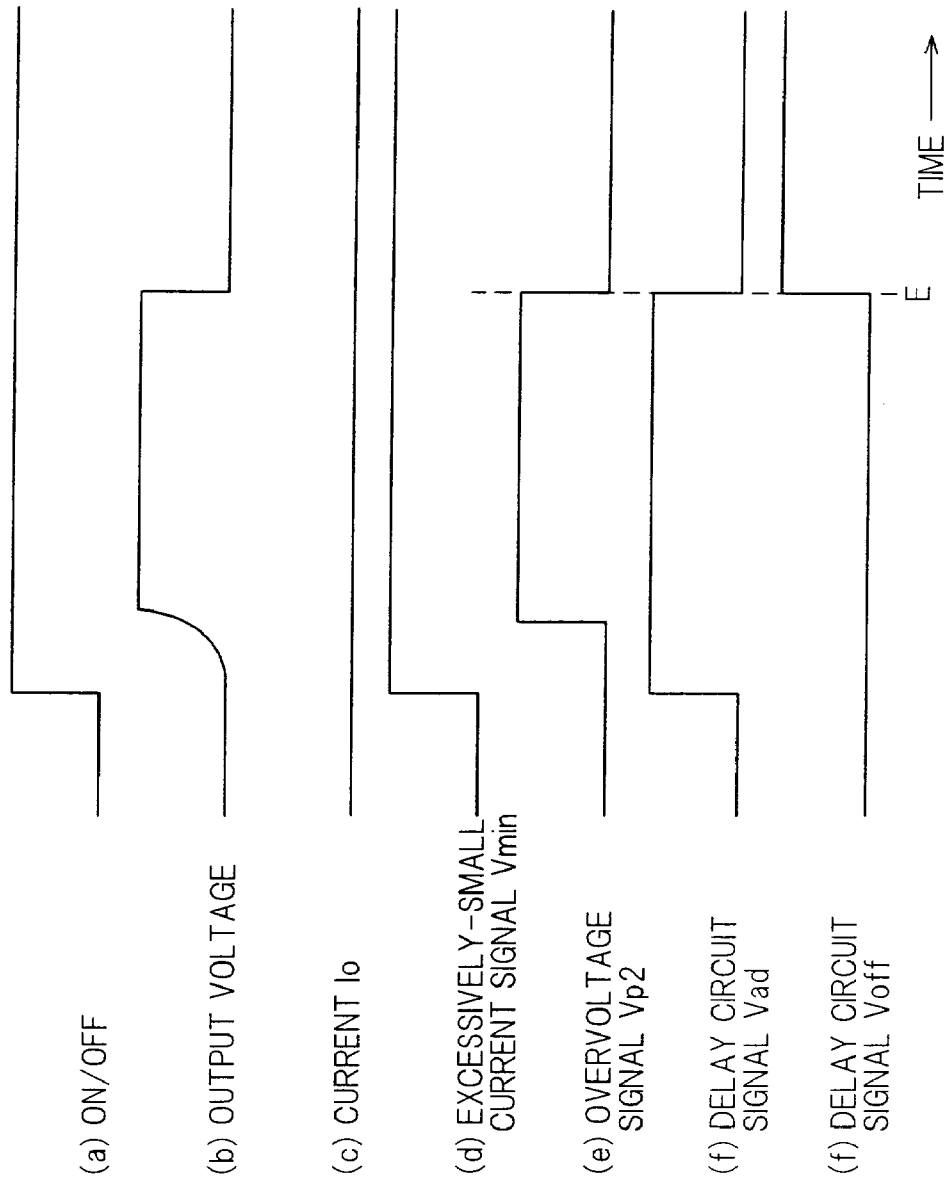
FIG. 12 is a timing chart showing the operation of the power supply circuit in FIG. 9 in no-loaded state.

FIG. 12 shows the operation of the power supply circuit in no-load state such as a breaking of connection line to load. In this situation, since being no-loaded is equivalent to having a very high impedance, output voltage Vo is kept high level as shown by (b) in FIG. 12. Also, because of being no-loaded, no load current Io flows. Therefore, is shown by (d) in FIG. 12, excessively-small current signal Vmin is kept high level after the inputting of ON signal. As shown by (e) in FIG. 12, output voltage Vp2 (overvoltage signal) is also kept high level. As a result, output voltage Vp2 turns into high level and the operation of the piezoelectric transformer 301 is thereby stopped.

Figure 13:
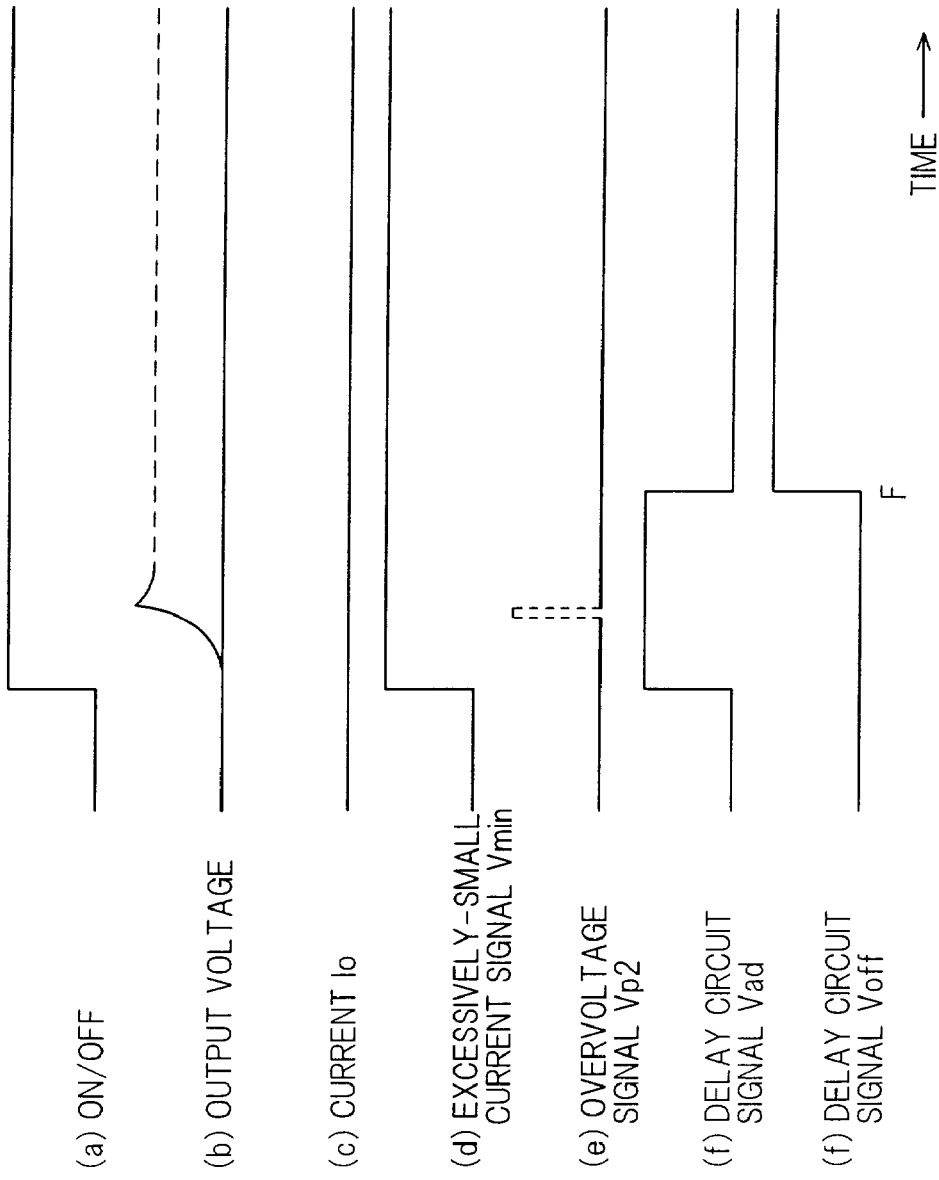
FIG. 13 is a timing chart showing the operation of the power supply circuit in FIG. 9 in case of a malfunction of booster circuit.

FIG. 13 shows the operation of the power supply circuit in case of a malfunction of the booster circuit. In this situation, output voltage Vo shown by (b) in FIG. 13 has a value near the normal voltage value shown by (b) in FIG. 10 or zero value. Load current Io is nearly zero as shown by (c) in FIG. 13. Therefore, as shown by (d) in FIG. 13, excessively-small current signal Vmin is kept high level, and overvoltage signal Vp2 shown by (e) in FIG. 13 is output as high level for a short time or is kept low level. Even if overvoltage signal Vp2 becomes high level, it is limited to a very short time. Therefore, after delay circuit signal Vad is kept high level for a relatively short time, at time C the shut-off operation starts as shown by (g) in FIG. 13 and the operation of the piezoelectric transformer 301 is thereby stopped.

Figure 14:
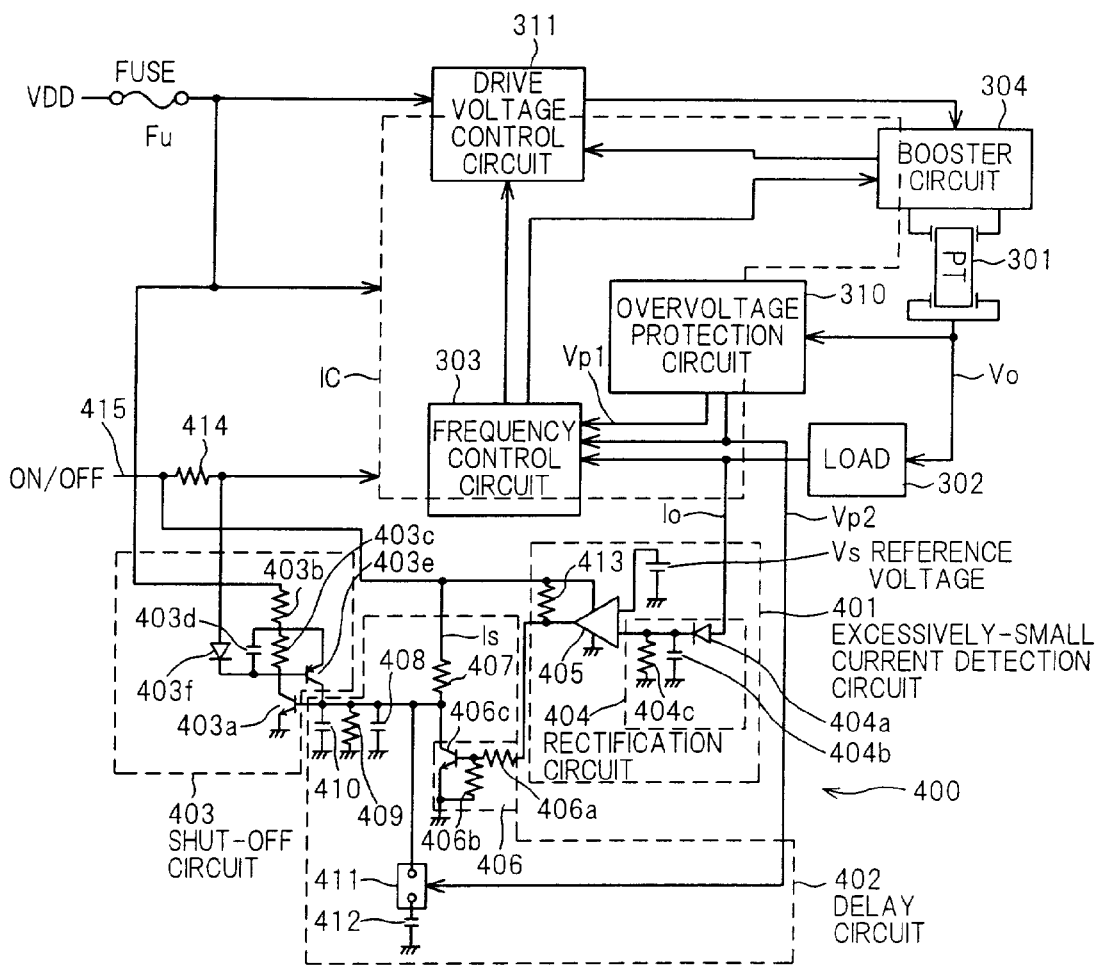
FIG. 14 is a circuit diagram showing the detailed composition of a drive circuit in FIG. 9.

FIG. 14 shows the detailed composition of shut-off section 400 in FIG. 9. All or part of the frequency control circuit 303, overvoltage protection circuit 310 and the drive voltage control circuit 311 are mounted in one IC package, except adjustment constant. The delay circuit 402 is composed of an amplification section 406 having resistors 406a, 406b composing a voltage division circuit and transistor 406c, a resistor 407 as a load to the transistor 406c, capacitor 408, a resistor 409 and a capacitor 410 which are connected between the collector of the transistor 406c and the earth line, a witch 411 connected to the collector of the transistor 406c, and capacitor 412 connected between the switch 411 and the earth line. To the resistor 406a, a resistor 413 connected between the output terminal of the comparator 405 and the power supply VDD is connected in series.

The shut-off circuit 403 is composed of a transistor 403a which is operated by the output signal of the delay circuit 402, resistors 403b and 403c connected between the power supply VDD and the collector of the transistor 403a, a capacitor 403d connected in parallel to the resistor 403c, and a transistor 403e. The transistor 403e is provided with a collector connected to the base of the transistor 403a, a base connected to the collector of the transistor 403a, and an emitter connected to the connection point (voltage division point) of the resistors 403b and 403c. Also, the rectification circuit 404 is composed of a capacitor 404b to smooth the rectified output of the diode 404a, and a load resistor 404c.

Although the IC-built-in circuit is operated by power supplied from the power supply VDD, when a voltage higher than a predetermined voltage is not applied to the ON/OFF terminal, the power supplying from the VDD is shut off. The power supply VDD is a voltage to be applied always when an AC adapter (or a battery pack etc.) is connected to a notebook computer. Also, ON/OFF signal is applied when the power switch of the notebook computer is turned on.

The rectification circuit 404 rectifies and smoothes load current Io. The comparator 405 compares the output voltage of the rectification circuit 404 with reference voltage Vs. When reference voltage Vs is smaller, high-level voltage is output through the resistor 413 to the delay circuit 402. The transistor 406c in the amplification section 406 turns on when high- level voltage is applied to its base, inpouring current Is from ON/OFF signal line 415 to the earth line. Another input to the delay circuit 402 is output voltage Vp2 of the overvoltage protection circuit 310, and this voltage is input to the switch 411. The switch 411 allows the terminals to be electrically connected each other while input more than a given value exists. When the switch 411 is electrically connected, the capacitor 412 is connected to the base of the transistor 403a.

The shut-off circuit 403 converts current Is from the ON/OFF line 415 into base voltage of the transistor 403a. The transistor 403a turns on when the base voltage becomes higher than a predetermined value, grounding the ON/OFF line through the resistor 414 and the diode 403f. Once the transistor 403a is turned on, its ON state is continuously kept to turn on the transistor 403a. When the ON/OFF line is grounded through the transistor 403a, voltage being applied from the ON/OFF line 415 to the IC lowers. As a result, the supply of power VDD into the IC is stopped and thereby the operation of the piezoelectric transformer 301 is stopped.

The operation of the circuit in FIG. 14 is explained below.

When load current Io reduces by some cause while power VDD is supplied and ON signal is applied to the ON/OFF line 415, the excessively-small current detection circuit 401, the delay circuit 402 and the shut-off circuit 403 are operated as described below, thereby the operation of the piezoelectric transformer 301 is stopped to shut off output voltage Vo.

When load current Io is small, the voltage conversion value is lower than reference voltage Vs and the output of the comparator 405 becomes low level. Therefore, the transistor 406a is turned off. Here, current Is from the ON/OFF line 415 raises the base voltage of the transistor 403a through the circuit of the resistors 407, 409 and the capacitors 408, 410. When the base voltage of the transistor 403a exceeds a predetermined value according as the capacitors 408, 410 are charged, the transistor 403a turns on. Thereby, the ON/OFF line 415 is grounded through the circuit of the resistor 414, the diode 403f and the transistor 403a. As a result, voltage applied from the ON/OFF line 415 to the IC lowers significantly and the supply of power VDD into the IC is shut off. Thus, the operation of the piezoelectric transformer 301 is stopped. When the piezoelectric transformer 301 stops operating, the output of the piezoelectric transformer 301 disappears. In this case, the operation time from the inputting of ON/OFF signal to the turn-on of the transistor 403a is about 0.1 second. Namely, the piezoelectric transformer 301 stops operating approximately concurrently with the turn-on of the transistor 403a.

When output voltage Vo of the piezoelectric transformer 301 is high so that output voltages Vp1 and Vp2 can be generated from the overvoltage protection circuit 310 and the voltage conversion value of load current Io is smaller than reference voltage Vs since load current Io is smaller than a predetermined value, the operation below is conducted to stop the operation of the piezoelectric transformer 301 to shut off the output. When the overvoltage protection circuit 310 generates high-level output voltage Vp2, the switch 114 is turned on.

Figure 6:
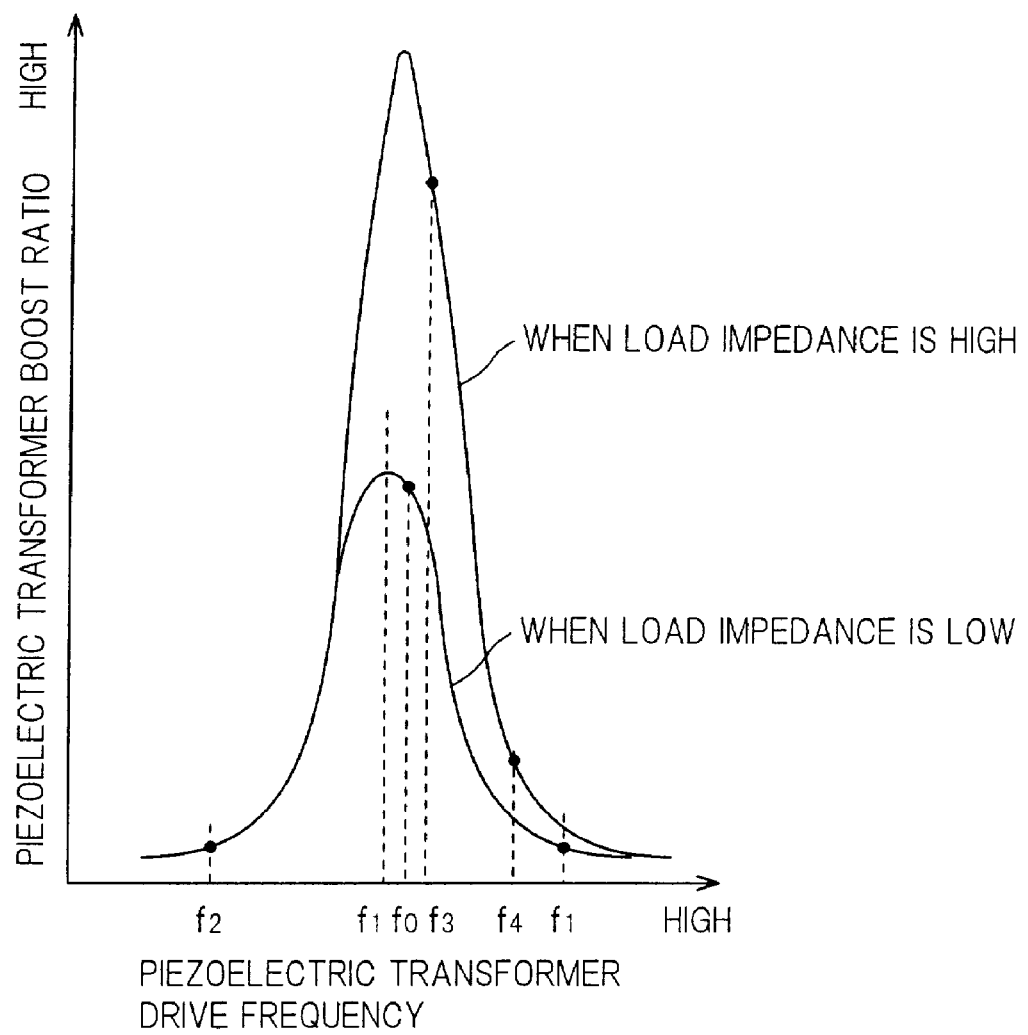
FIG. 6 is a graph showing the output characteristic of the piezoelectric transformer 301 in FIG. 5.
Figure 7:
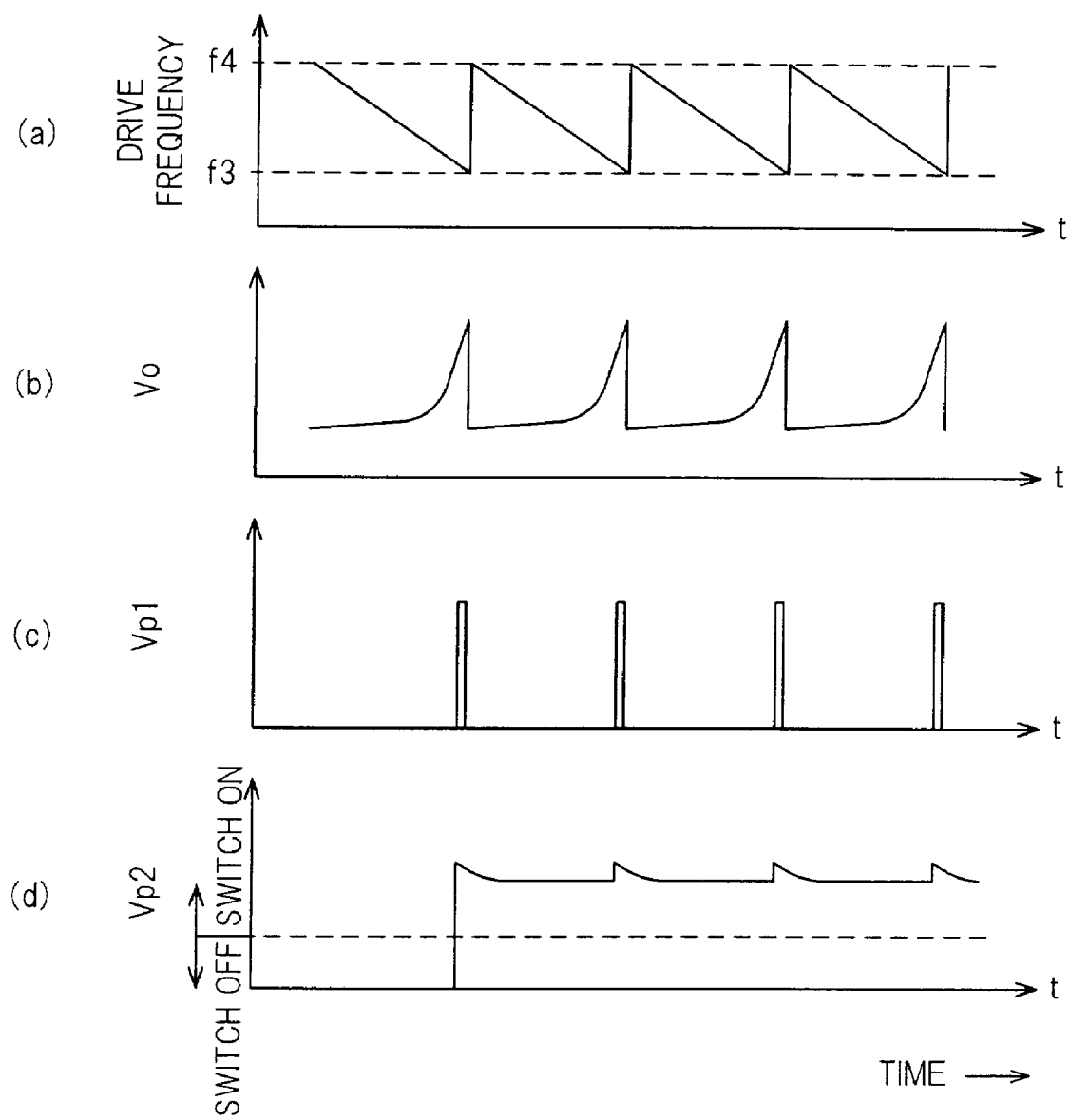
FIG. 7 is waveform diagrams showing the operation of parts in the power supply circuit in FIG. 5.
Figure 8:
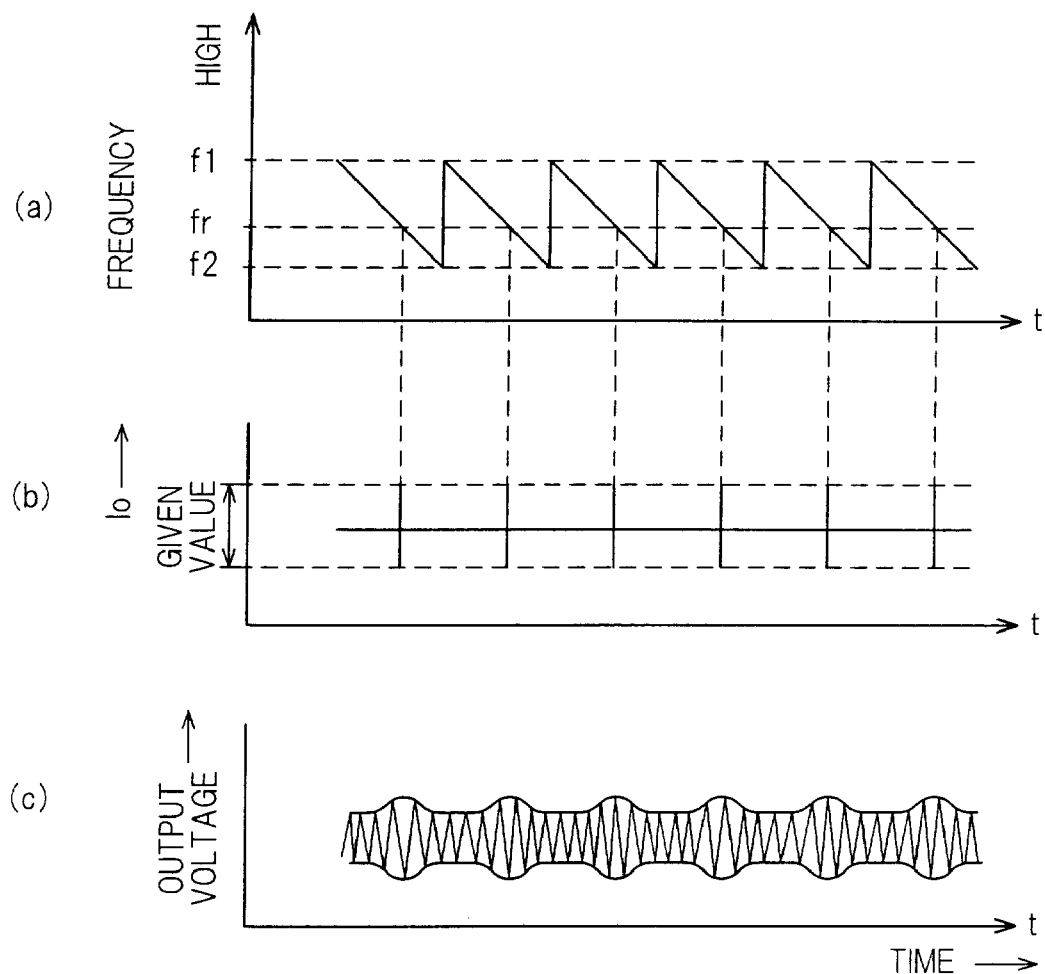
FIG. 8 is waveform diagrams showing the operation of parts in FIG. 5 when one of the switching transistors does not operate.

On the other hand, when the overvoltage protection circuit 310 generates output voltage Vp1 according to the detection of the overvoltage of output voltage Vo, the drive frequency of the piezoelectric transformer 301 is changed from f4 to f3 in FIG. 6, and then the frequency lowers from f4 to f3 again. However, during this time, output voltage Vp2 is continuously at high level to turn on the switch 114. Thus, when the load impedance is kept high impedance equivalently as in the opening of load, output voltage Vp2 Ls kept high level. The relationship above is as shown in FIG. 7. While the booster circuit 304 is scanned by the drive frequency f of the piezoelectric transformer 301, the switch 114 is turned on continuously and thereby the capacitor 412 is kept connected to the base of the transistor 403a.

Meanwhile, it is important that the capacitance value of the capacitor 412 is set so that it takes about 5 to 6 seconds from the inputting of ON/OFF signal to the turn-on of the transistor 403a, under the condition that the overvoltage protection circuit 310 generates output voltages Vp1 and Vp2 and the transistor 406c is turned off. Thus, in the case that output voltage Vp2 from the overvoltage protection circuit 310 is high level, the capacitance value to be charged by current Is becomes larger. Therefore, the increase of the base voltage of the transistor 403a becomes slow, and it takes a long time until the operation of the piezoelectric transformer 301 is stopped.

As described above, the shut-off circuit 403 in FIG. 14 operates after a time as short as about 0.1 second in case of a malfunction of the booster circuit 403, and operates after a time as long as about 5 to 6 seconds in case of the opening of load, before the lighting of load and the non-lighting of load due to deterioration of load characteristic.

The operations of the power supply circuit of the invention explained above are summarized in Table 1.

TABLE 1

Figure 2:
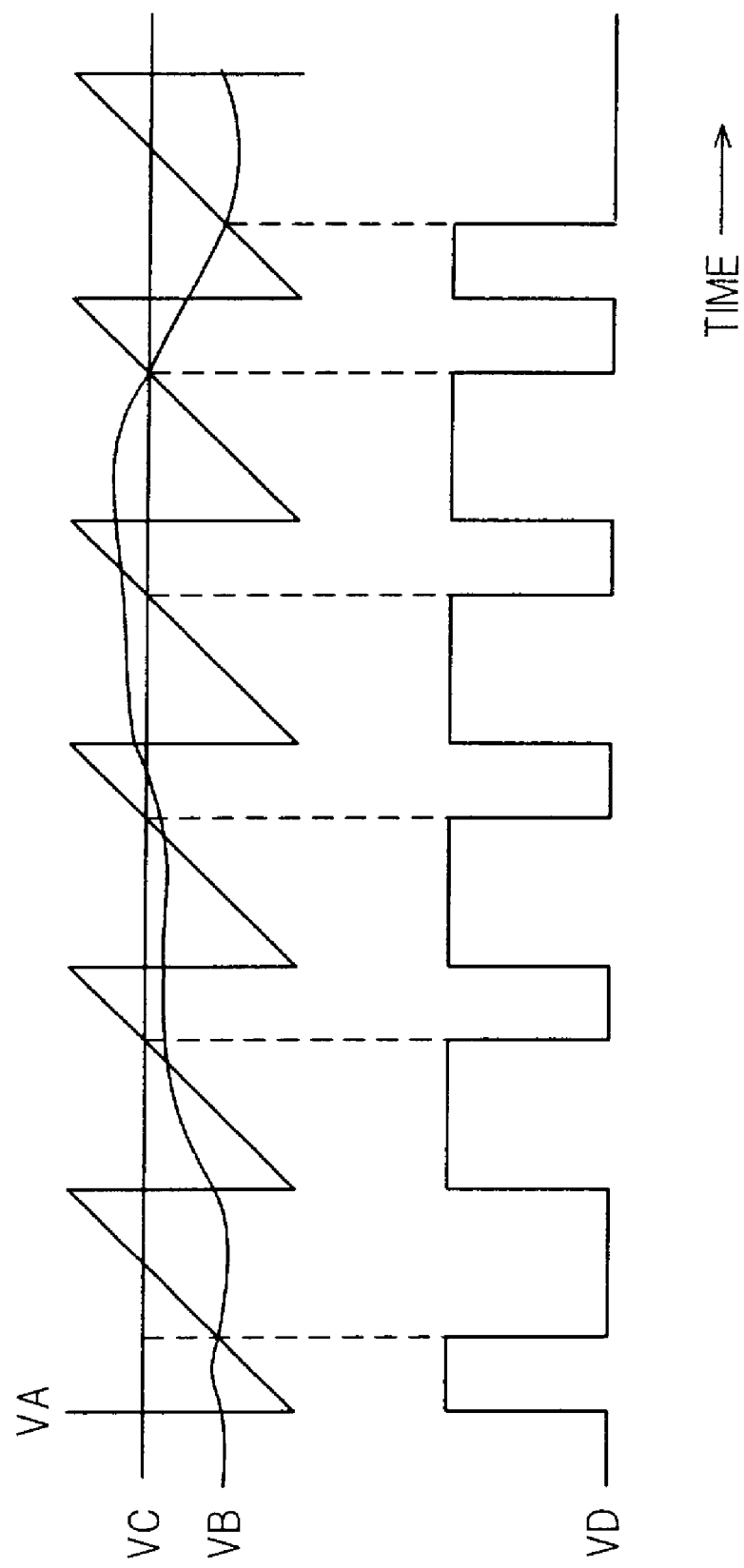
FIG. 2 is a waveform diagram showing the operation of parts in the power supply circuit in FIG. 1.
Figure 3:
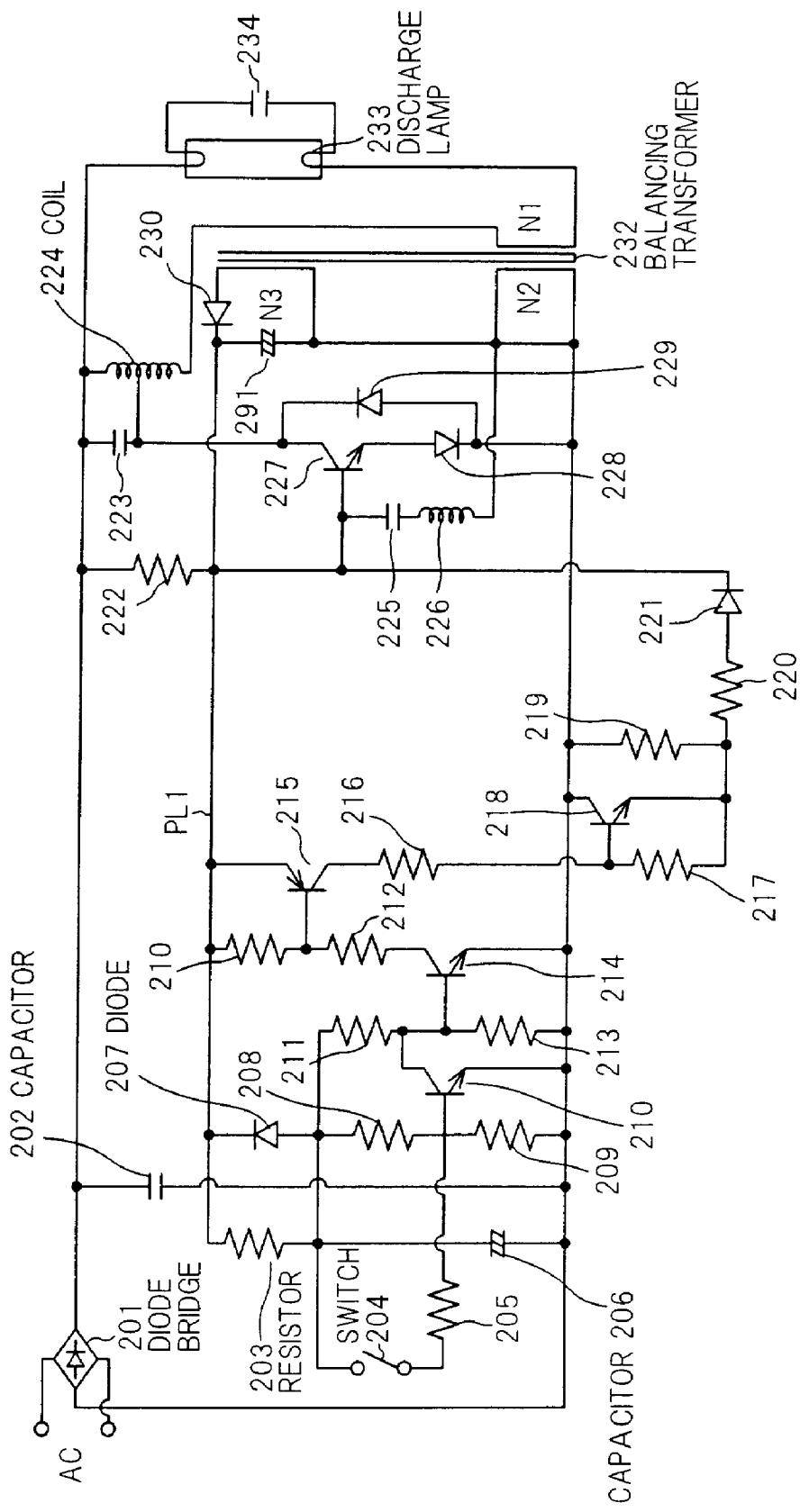
FIG. 3 is a circuit diagram showing the second example of conventional power supply circuits.
Figure 4:
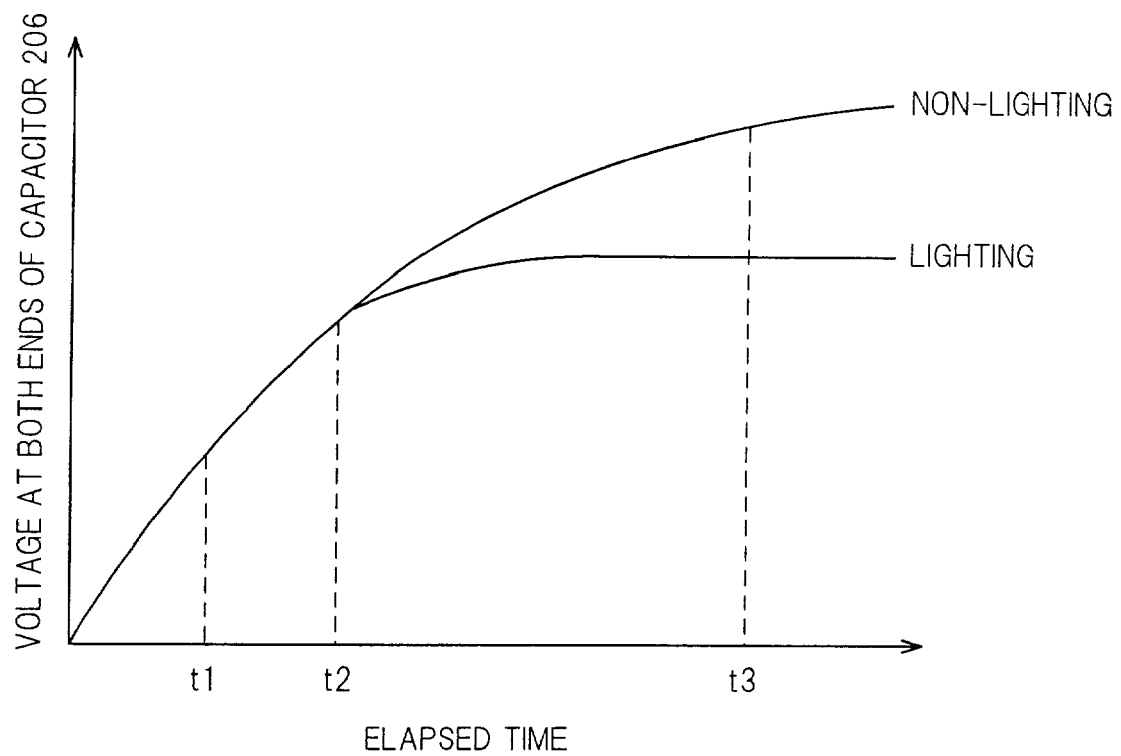
FIG. 4 is a graph showing a change of the terminal voltage of an input-side capacitor 206 in the power supply circuit in FIG. 3.

| Output voltage Vo | Load current Io is small or zero | Typical cause of malfunction |
| --- | --- | --- |
| Small or zero | About 0.1 sec. until the shut-off of outputting | Malfunction of booster circuit (FIG. 9) |
| Normal | (0.05 to 0.15 sec.) | Malfunction of booster circuit (FIG. 2) |
| Large | About 5 to 6 sec. until the shut-off of outputting | Opening of load, before lighting of load, non-lighting of load |

In table 1, it takes 0.1 second to shut off early when detecting the malfunction of booster circuit, and it takes 5 to 6 seconds to shut off slowly when detecting high impedance of load. However, these are typical values for the combination of general piezoelectric transformer and cold-cathode tube, and may be altered depending on the constant of piezoelectric transformer or the kind of load.

For example, when the backlight of 10.4 inch LCD for notebook computer is lighted using the piezoelectric transformer inverter in FIG. 14 designed by the inventor of this invention, it takes 6 msec from the turn-on of the power supply until the lighting of the backlight in normally-black mode at ambient temperature of 0° C. Therefore, in this combination of piezoelectric transformer inverter and LCD backlight, for example, when 0.1 second is set to shut off early when detecting the malfunction of booster circuit, and 5 to 6 seconds are set to shut off slowly when detecting high impedance of load, the lighting of LCD in normally-black mode at ambient temperature of 0° C. can be guaranteed while preventing the emission of smoke in malfunction of booster circuit.

Figure 15:
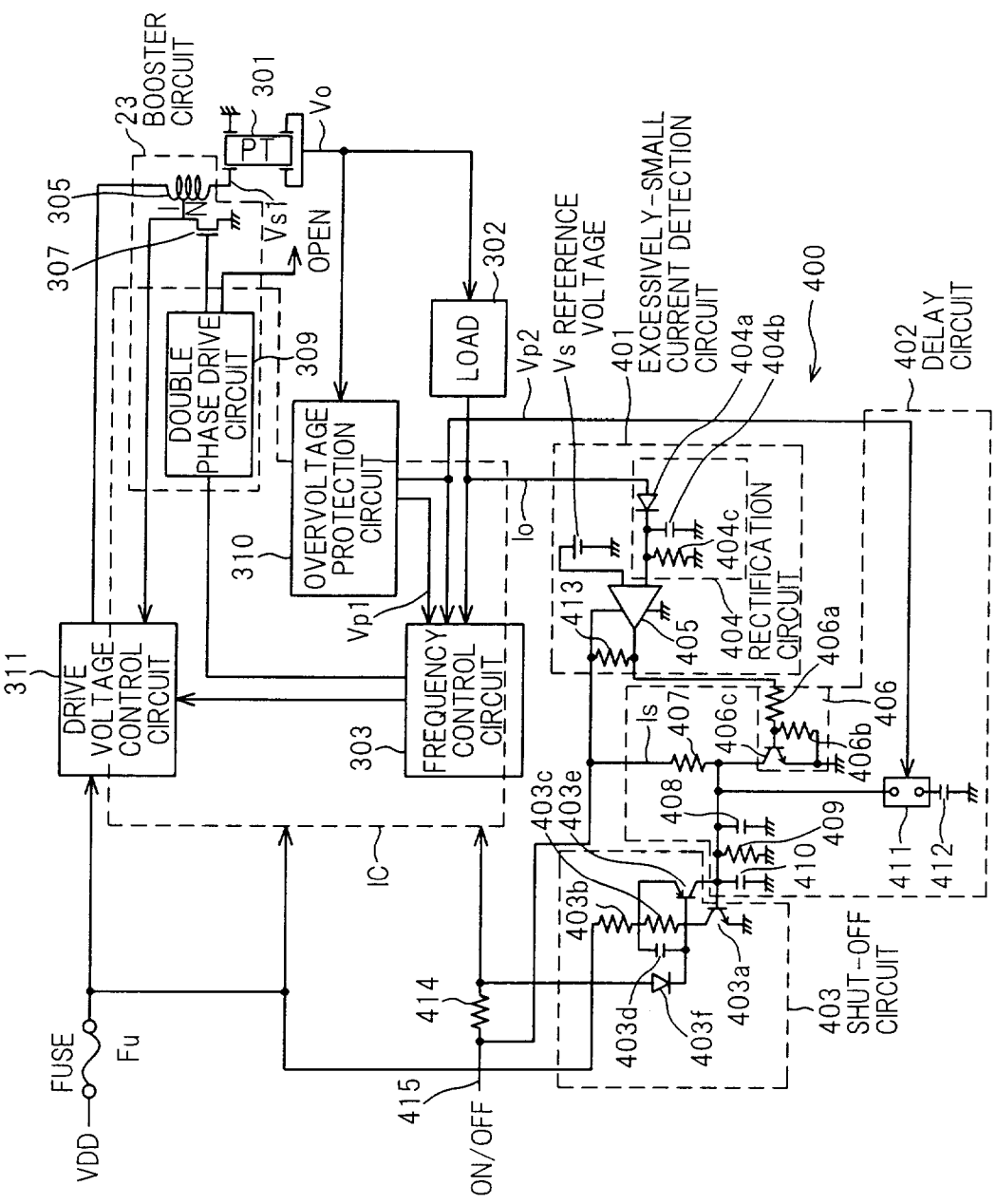
FIG. 15 is a circuit diagram showing a power supply circuit in another preferred embodiment according to the invention.

FIG. 15 shows a power supply circuit in another preferred embodiment according to the invention.

Figure 5:
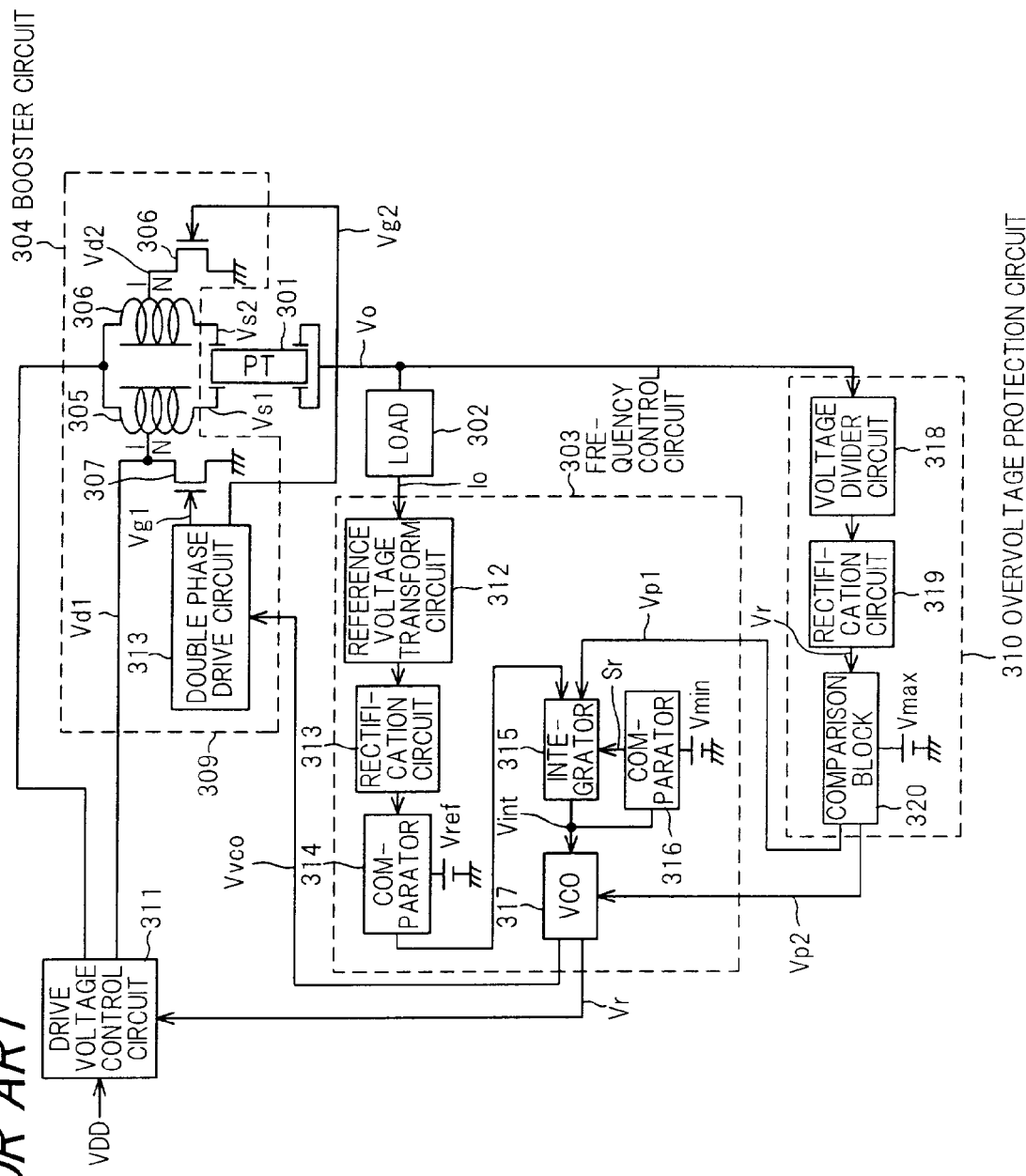
FIG. 5 is a circuit diagram showing the convention power supply circuit using a piezoelectric transformer 301.

The main composition of this embodiment is the same as that in FIG. 5. The power supply circuit of this embodiment is composed of the piezoelectric transformer 301, the frequency control circuit 303, the booster circuit 304, the double phase drive circuit 309, and the drive voltage control circuit 311. Furthermore, instead of the overvoltage protection circuit 310 in FIG. 5, it is composed of the shut-off section 400 including the excessively-small current detection circuit 401, the delay circuit 402, the shut-off circuit 403, the rectification circuit 404 and the comparator 405.

The difference between a booster circuit 23 in FIG. 15 and the booster circuit 304 in FIG. 14 is that in the booster circuit 23 the second automatic transformer 306 and the second switching transistor 308 are deleted and output voltage Vg2 of the double phase drive circuit 309 is opened without component to be linked. When in the booster circuit 23, there occurs such a malfunction that the switching operation of the switching transistor 307 is stopped, the piezoelectric transformer 301 gives no output. Thus, in such a case, there is no load current Io, therefore the transistor 406c of the excessively-small current detection circuit 401 is turned off, and there is no output voltage Vo from the piezoelectric transformer 301, therefore output voltage Vp2 from the overvoltage protection circuit 310 is kept low level and the switch 411 is kept opened. Therefore, power is shut off about 0.1 second after the inputting of ON/OFF signal. This case corresponds to the case of no load current Io and no voltage Vo in Table 1, and is different from the first embodiment in that the different value of Vo is provided. Meanwhile, also in the first embodiment, if there occurs a malfunction that both the first switching transistor 307 and the second switching transistor 308 stop the switching operation, then it corresponds to the case of no load current Io and no voltage Vo in Table 1.

Advantages of the Invention

In this invention, detecting the state of outputting from the booster circuit to the piezoelectric transformer and the change of load impedance, based on the detection results, a time that allows the booster circuit to stop operating is set. Thus, according to this setting, the booster circuit is controlled to stop operating. Therefore, even in case of high load impedance due to low temperature, a malfunction in the output system including the booster circuit can be detected while guaranteeing the lighting operation etc. of load. Namely, since in case of environment at low temperature, the cold-cathode tube before the application of voltage has a high impedance, it takes a relatively long time from the start of voltage application until the lighting. So, by detecting both the output voltage and the load current, it can be determined whether the booster circuit has a malfunction or not.

Also, when the shut-off circuit operates, ON/OFF voltage supplied to IC lowers, thereby, inside the IC, the power supply from VDD to the components of the IC is stopped. Thus, in the shut-off operation, power consumption in the IC can be reduced to zero.

Although the invention has been described with respect to specific embodiment for complete and clear disclosure, the appended claims are not to be thus limited but are to be construed as embodying all modification and alternative constructions that may be occurred to one skilled in the art which fairly fall within the basic teaching here is set forth.

What is claimed is:

1. A power supply circuit for boosting drive voltage by a booster circuit, inputting the boosted voltage to the primary side of a piezoelectric transformer, and driving a load with an impedance of large temperature dependency by output voltage generated at the secondary side of the piezoelectric transformer, comprising:

an excessively-small current detection means that outputs excessively-small current signal when load current flowing through said load is smaller than a predetermined value;

a stopping means that stops the operation of said booster circuit when said excessively-small current signal is output; and a delaying means that sets a delay time according to the level of said output voltage;

wherein said stopping means determines the execution or inexecution of said operation according to the existence of said excessively-small current signal when said delay time passes.

2. A power supply circuit, according to claim 1, wherein:

said delaying means sets a first delay time that is more than the maximum value of a rising time determined based on said temperature dependency of said load, and a second delay time that is less than a time in which said booster circuit can be broken due to a malfunction.

3. A power supply circuit, according to claim 2, wherein:

said delaying means sets said first delay time when said output voltage is larger than a predetermined value.

4. A power supply circuit, according to claim 2, wherein:

said delaying means sets said second delay time when said output voltage is smaller than a predetermined value.

5. A power supply circuit, according to claim 1, wherein:

said excessively-small current detection means detects the load current of a cold-cathode tube as said load.

6. A power supply circuit, according to claim 2, wherein:

said delaying means sets about 5 to 6 seconds as said first delay time and sets about 0.05 to 0.15 second as said second delay time.

7. A power supply circuit, according to claim 3, wherein:

said delaying means sets said first delay time by that an additional capacitor is connected in parallel to a capacitor to set said second delay time, when said output voltage is larger than the predetermined value.

8. A power supply circuit, according to claim 1, wherein:

said excessively-small current detection means is composed of a rectification means that rectifies said load current and then outputs rectified signal, and a comparison means that compares the rectified signal with a reference value and then outputs said excessively-small current signal.

9. A power supply circuit, according to claim 1, wherein:

said stopping means stops the applying of said drive voltage to said booster circuit when conducting said operation.

10. A power supply circuit, according to claim 2, wherein:

said stopping means determines the inexecution of said operation when said delaying means sets said first delay time and said excessively-small current signal disappears before said first delay time passes.

11. A power supply circuit, according to claim 2, wherein:

said stopping means determines the execution of said operation when said delaying means sets said first delay time and said excessively-small current signal is output continuously after said first delay time passes.

12. A power supply circuit, according to claim 6, wherein:

said stopping means determines the execution of said operation after a time of 5 to 6 seconds passes when a cold-cathode tube as said load is not connected properly to the load circuit.

13. A power supply circuit, according to claim 6, wherein:

said stopping means determines the execution of said operation after a time of 5 to 6 seconds passes when a cold-cathode tube as said load does not light.

14. A power supply circuit, according to claim 2, wherein:

said stopping means determines the execution of said operation after a time of 0.05 to 0.15 second passes when said booster circuit incurs a malfunction.

15. A power supply circuit for boosting drive voltage by a booster circuit, inputting the boosted voltage to the primary side of a piezoelectric transformer, and driving a load with an impedance of large temperature dependency by output voltage generated at the secondary side of the piezoelectric transformer, comprising:

an excessively-small current detection means that outputs excessively-small current signal when load current flowing through said load is smaller than a predetermined value;

a stopping means that stops the operation of said booster circuit when said excessively-small current signal is output; and a delaying means that sets a delay time according to the level of said output voltage;

wherein said stopping means conducts said operation when the timing of said delay time is completed, and determines the inexecution of said operation when the timing of said delay time is discontinued.

16. A power supply circuit, according to claim 15, wherein:

said delaying means conducts the timing of said delay time by being input with said excessively-small current signal.

17. A power supply circuit, according to claim 15, wherein:

said delaying means discontinues the timing of said delay time when the inputting of said excessively-small current signal is discontinued.

* * * * *